United States Patent [19]
Ho et al.

[11] Patent Number: 5,926,403
[45] Date of Patent: Jul. 20, 1999

[54] METHOD AND SYSTEM FOR CONCURRENT COMPUTING BETWEEN HETEROGENEOUS SIMULATORS

[75] Inventors: Shirun Ho, Hachioji; Sigeo Ihara, Tokorozawa, both of Japan

[73] Assignee: Hitachi, Ltd., Tokyo, Japan

[21] Appl. No.: 08/861,849

[22] Filed: May 22, 1997

[30] Foreign Application Priority Data

May 23, 1996 [JP] Japan ................................... 8-128111

[51] Int. Cl.$^6$ ................................................. G06F 15/16
[52] U.S. Cl. .......................................................... 364/578
[58] Field of Search ................................... 364/578, 512, 364/243, 232.22, 468.05, 601; 395/500, 551, 200.62, 800.32, 800.34, 562; 370/401, 418

[56] References Cited

U.S. PATENT DOCUMENTS

| | | | |
|---|---|---|---|
| 5,191,578 | 3/1993 | Lee | 370/63 |
| 5,317,568 | 5/1994 | Bixby et al. | 370/85.6 |
| 5,369,570 | 11/1994 | Parad | 364/401 |
| 5,473,608 | 12/1995 | Gagne et al. | 370/85.13 |
| 5,566,349 | 10/1996 | Trout | 395/840 |
| 5,844,553 | 12/1998 | Hao et al. | 345/329 |

OTHER PUBLICATIONS

Bourgat, J.F. et al, Coupling Boltzman and Euler Equations without Overlapping, Contemporary Mathetmatics, 1994 V. 157 pp. 377–398.

Primary Examiner—Kevin J. Teska
Assistant Examiner—Matthew Loppnow
Attorney, Agent, or Firm—Sofer & Haroun, LLP

[57] ABSTRACT

An extremely high-speed, very stable system and a method for concurrent computing between heterogeneous simulators are shown, in which heterogeneous simulators for analyzing a complicated physical phenomenon are coupled based on a coupled equation thereby to obviate the disadvantages of the conventional noncoupled and coupled methods. A numerical calculation unit includes a calculation control unit equipped with an agent function having a heterogeneous coupling variational equation calculation unit, a convergence decision unit and a search vector setting unit. A parameter and a variable are supplied from the heterogeneous coupling variational equation calculation unit into and out of a simulator A, a simulator B and a heterogeneous coupled equation thereby to form the heterogeneous coupling variational equation 1 and thus to determine a globally consistent solution. With this configuration, a globally consistent solution can be obtained automatically simply by setting a heterogeneous coupled equation, and therefore the analysis and design efforts of an operator can be very effectively supported in analyzing complicated physical phenomena in all the fields of advanced science and technologies.

12 Claims, 16 Drawing Sheets

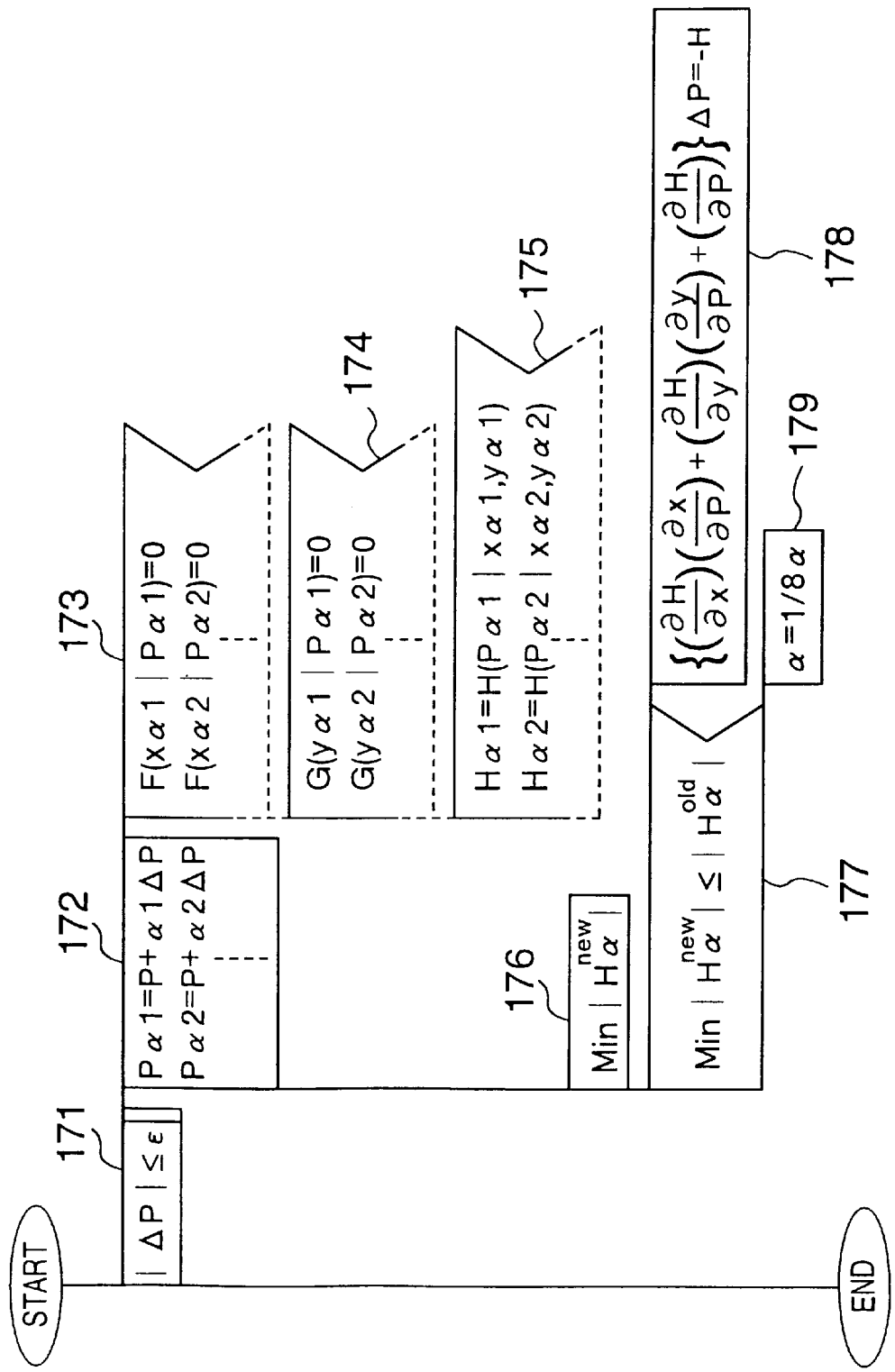

METHOD AND SYSTEM FOR CONCURRENT COMPUTING BETWEEN HETEROGENEOUS SIMULATORS

BACKGROUND OF THE INVENTION

The present invention relates to a simulator or a CAD (Computer Aided Design) system used widely for analysis and designing in all fields of advanced science and technologies including the nanometeric devices, the extremely high-speed fluid dynamics, the milliwave monolithic integrated circuits and the magnetic memory units, or more in particular to a method and a system for concurrent computing between heterogenous simulators in which heterogeneous simulators are efficiently coupled and a globally consistent solution is determined in order to analyze complicated physical phenomena, and which is capable of concurrent computing with an extremely high speed, a very high stability and a scalability. More specifically, the invention relates to an algorithm for the concurrent computing.

In the case where a simulator is used, the operator generally sets a parameter p for the material or structural modelling, the physical modelling or the numerical experimental modelling of the numerical calculation technique through an input display unit 1 including a mouse, a keyboard and a display, as shown in FIG. 6. According to this parameter p, a numerical calculation unit 3 including a CPU (Central Processing Unit), a memory and a network performs computations on a simulation program and determines a self-consistent solution of variables x, y of nonlinear simultaneous equations formed of the parameter p. The results of the variables x, y are displayed in the form of data or graphics on an output display unit 2 including a display unit and support the analysis and designing work by the operator.

In recent years, however, the science and technologies have made such a progress that the trend is toward more and more material and structural ramifications of systems to be analyzed and designed. At the same time, the physical mechanisms have been complicated to such an extent that the physical modelling and the numerical computation techniques are ever on the way of complication. For this reason, the critical problem faced by the engineers engaged in the development of simulators is that a program development schedule is delayed more and an enormous amount of time is required for numerical computations with the progress of complication of the physical model.

As shown in FIG. 6, assume that a simulator A has a parameter p and a variable x, and a simulator B has a parameter p and a variable y. Also, assume that the complication of the physical phenomena has formed a heterogeneous coupled equation 6 correlating the parameter p and the variables x, y. As a specific example, the general traditional fluid simulators are still applicable to substantially all the domains including the electrodes of the nanometeric devices. The very infinitesimal domains of the nanometeric structure, on the other hand, requires application of a quantum transportation simulator such as the tunnel effect. If means for using each simulator in the right way for the right applications is selected instead of restructuring an integral simulator applicable to the whole system, a coupled equation is formed which guarantees the current continuity in the boundary domain between the classic theory and the quantum theory. In "Contemporary Mathematics Vol. 157, pp. 377–398, 1994, J. F. Bourgat, et al., describe a coupled equation as a boundary condition and a problem of combination of Boltzmann equation and Euler equation or Navier Stokes equation to be applied to the extremely high-speed aerodynamics. The milliwave monolithic integrated circuits, for example, involves a general fluid simulator applicable to the electronic devices, a simulator based on the Maxwell equation applicable to the milliwave propagating in space and the coupled equation in the boundary domain. Further, a register simulator, a reproduce simulator and the coupled equation are formed for the register and reproduce simulation of magnetic memory. All of theme are the problems encountered in all the fields of advanced science and technologies with the progress of complication of the physical phenomena.

Normally, simulation engineers take the approach of structuring a program for a heterogeneous coupled equation 6 and combining a simulator A with a the simulator B. First, a parameter p is set in a numerical calculation unit 3 through an input display unit 1. A locally consistent solution x obtained from the simulator A and a locally consistent solution y obtained from the simulator B for the parameter p are sent to the heterogeneos coupled equation 6, which is solved to determine an increment $\Delta p$ of the parameter p. A convergence decision unit 9 decides on the convergence of $\Delta p$. In the absence of convergence, a search vector setting unit 10 sets a new parameter p by increasing the parameter p by $\Delta p$. This process is repeated, and if a convergence is obtained, a value p, x, y of a globally consistent solution is displayed on an output display unit 2.

The method shown in FIG. 6 is called the uncoupled method. Since the heterogeneous coupled equation 6 can be developed individually, the program development involved is not so extensive, and each iteration requires only a small length of time. In view of the fact that the increment of the parameter p and the variables x, y are independently determined, however, the number of iterations increases, resulting in a very low convergence and a high risk of divergence.

On the other hand, the method shown in FIG. 7 is called the coupled method. In spite of a stable convergence obtained due to the dependent determination of the increment of the parameter p and the variables x, y, this method has the disadvantage that the restructuring of the heterogeneous coupled equation 6 including the simulator A and the simulator B greatly increases the scale of program development while at the same time considerably increasing the time required for each iteration.

In short, the above-mentioned decoupled method and the coupled method have the advantages and disadvantages in respect of stability and speed.

SUMMARY OF THE INVENTION

The object of the present invention is to solve the above-mentioned problems of the prior art and to provide a method and a system for concurrent computing between heterogeneous simulators having an extremely high speed, a very high stability and a superior scalability.

In order to achieve the above-mentioned object, according to the present invention, there is provided a method and a system having a configuration described in (1) to (7) below for concurrent computing between heterogeneous simulators.

(1) As shown in FIG. 1, a numerical calculation unit 3 includes a calculation control unit 7 having the agent function composed of a heterogeneous coupling variational equation calculation unit 8, a convergence decision unit 9 for the parameter p and a search vector setting unit 10 for the parameter p. The heterogeneous coupling variational equation calculation unit 8 retrieves a locally consistent solution x obtained from the simulator A and a locally consistent solution y obtained from the simulator B for the parameter p. The calculation unit 8 also substitutes the parameter p and the variables x, y into the heterogeneous coupled equation 6 and retrieves a substitute H. The increment Δp of the parameter p is determined by solving the heterogeneous coupling variation equation formed of the values thus retrieved.

The convergence decision unit 9 decides on the convergence of Δp. In the absence of convergence, the search vector setting unit 10 increments the value p by Δp and sets a new parameter p. The process is repeated for retrieving locally consistent solutions from the simulators. In the presence of convergence, on the other hand, the values p, x, y of a globally consistent solution are displayed on the output display unit 2.

(2) The calculation control unit 7 of the system for concurrent computing between heterogeneous simulators described in (1) includes a concurrent differential calculation control unit 11 as shown in FIG. 2.

The concurrent differential calculation control unit 11 sets a plurality of simulators A, a plurality of simulators B and a plurality of heterogeneous coupled equations 6 in the numerical calculation unit 3.

Then, the parameter p (p1, . . . , pl) is modulated by infinitesimal amounts δp1, . . . , δpl, and the resulting values p+δp1, . . . , p+δpl and p are set and applied to the simulators A and the simulators B. The locally consistent solutions x+δx1, . . . , x+δxm, x obtained by the concurrent processing of a plurality of the simulators A and the locally consistent solutions y+δy1, . . . , y+δyn, y obtained by the concurrent processing of a plurality of the simulators B are retrieved and sent to the heterogeneous coupling variational equation calculation unit 8.

The heterogeneous coupling variational equation calculation unit 8 sets the parameters p+δp1, . . . , p+δpl, p and the variables x+δx1, . . . , x+δxm, x+δxm, x and y+δy1, . . . , y+δyn, y again in the concurrent differential calculation control unit 11.

Further, the concurrent differential calculation control unit 11 applies the set parameters p+δp1, . . . , p+δpl, p, the variables x+δx1, . . . , x+δxm, x and the variables y+δy1, . . . , δyn, y to a plurality of the heterogeneous coupled equations 6, retrieves the substitutes H+δH1, . . . , H obtained by the concurrent processing, and applies them to the heterogeneous coupling variational equation calculation unit 8. The increment Δp of the parameter p is determined by solving the heterogeneous coupling variation equation formed of these parameters p+δp1, . . . , p+δpl, p, the variables x+δx1, . . . , x+δxm, x, the variables y+δy1, . . . , y+δyn, y, and the substitutes H+δH1, . . . , H.

(3) The calculation control unit 7 for the system for concurrent computing between heterogeneous simulators described in (1) or (2) above includes a search vector setting unit 10, a concurrent calculation control unit 12 and an optimum search vector setting unit 13, as shown in FIG. 3.

The search vector setting unit 10 sets new parameters pα1, pα2 and so on (p+α1Δp, p+α2Δp and so on) including a plurality of increment coefficients α (α1, α2 and so on) for the increment Δp of the parameter p in the concurrent calculation control unit 12.

The concurrent calculation control unit 12 sets a plurality of the simulators A, a plurality of the simulators B and a plurality of the heterogeneous coupled equations 6 in the numerical calculation unit 3. Then, the parameters pα1, pα2 and so on are applied to a plurality of the simulators A and a plurality of the simulators B. The locally consistent solutions xα1, xα2 and so on obtained by the concurrent processing in the simulators A and the locally consistent solutions yα1, yα2 and so on obtained by the concurrent processing in a plurality of the simulators B are retrieved and applied to the numerical calculation unit 8 for the heterogeneous coupling variational equation.

The heterogeneous coupling variational calculation unit 8 sets the parameters pα1, pα2 and so on and the variables xα1, xα2 and so on and yα1, yα2 and so on again in the concurrent calculation control unit 12.

The concurrent calculation control unit 12 applies the set parameters pα1, pα2 and so on, the variables xα1, xα2 and so on and the variables yα1, yα2 and so on to the heterogeneous coupled equation 6, retrieves the concurrently processed substitutes Hα1, Hα2 and so on, and applies them to the optimum search vector setting unit 13.

One of the values Hα1, Hα2 and so on associated with a minimum norm smaller than the minimum norm of H in the preceding iterative calculation is applied by the optimum search vector setting unit 13 to the heterogeneous coupling variational equation calculation unit 8.

The heterogeneous coupling variational equation calculation unit 8 solves only the heterogeneous coupling variational equation formed from the parameter pα, the variables xα, yα and the substitute Hα for the set value α thereby to determine the increment Δp of the parameter p.

(4) The search vector setting unit 10 of the system for concurrent computing between heterogeneous simulators described in (3) above sets three increment coefficients 0.5α, α, 2.0α (0<α<1) for the increment Δp of the parameter p as shown in FIG. 4.

In the case where one of the values Hα1, Hα2 and so on associated with a minimum norm is larger than the minimum norm of H in the preceding iterative calculation, the optimum search vector setting unit 13 multiplies α by ⅛ and applies the result to the search vector setting unit 10.

(5) The heterogeneous coupling variational equation calculation unit 8 of the system for concurrent computing between heterogeneous simulators described in (1), (2), (3) or (4) above sets the linear variational equation (equation 1) for a heterogeneous coupled equation.

$$\left(\frac{\partial H}{\partial x}\frac{\partial x}{\partial p} + \frac{\partial H}{\partial y}\frac{\partial y}{\partial p} + \frac{\partial H}{\partial p}\right)^{(k)} \Delta p^{(k+1)} = -H^{(k)} \quad (1)$$

(6) In the system for concurrent computing between heterogeneous simulators described in (1), (2), (3) or (4) above, as shown in FIG. 5, at least three simulators 4, 5, 5' including the parameter p and the variables x, y, and so on and the heterogeneous coupled equation 6 correlating the parameter p and the variables x, y and so on are set in the numerical calculation unit 3 from the input display unit 1. The system thus further comprises a heterogeneous coupling variational equation calculation unit 8' corresponding to the heterogeneous coupled equation thus set.

(7) In the system for concurrent computing between heterogeneous simulators described in (6) above, the linear variation equation (equation 2) is set for the heterogeneous coupled equation.

$$\left(\frac{\partial H}{\partial x}\frac{\partial x}{\partial p}+\frac{\partial H}{\partial y}\frac{\partial y}{\partial p}+\cdots+\frac{\partial H}{\partial p}\right)^{(k)}\Delta p^{(k+1)}=-H^{(k)} \quad (2)$$

A method and a system for concurrent computing between heterogeneous simulators according to this invention are very superior in speed, stability and scalability and can couple heterogeneous simulators to each other very efficiently as compared with the conventional noncoupled method (FIG. 6) and the coupled method (FIG. 7).

According to the coupled method shown in FIG. 7, a globally consistent solution is determined of the nonlinear simultaneous equations $F(x|p)=0$, $G(y|p)=0$ and $H(p|x, y)=0$ formed from the simulator A, the simulator B and the heterogeneous coupled equation 6. The linear variational equation for the nonlinear simultaneous equations is given by equation 3, where the parameter p, the variables x, y are 1, m and n in number, respectively.

$$\begin{pmatrix} \left[\frac{\partial H}{\partial p}\right]^{(k)}_{l\times l} & \left[\frac{\partial H}{\partial x}\right]^{(k)}_{l\times m} & \left[\frac{\partial H}{\partial y}\right]^{(k)}_{l\times n} \\ \left[\frac{\partial F}{\partial p}\right]^{(k)}_{m\times l} & \left[\frac{\partial F}{\partial x}\right]^{(k)}_{m\times m} & 0 \\ \left[\frac{\partial G}{\partial p}\right]^{(k)}_{n\times l} & 0 & \left[\frac{\partial G}{\partial y}\right]^{(k)}_{n\times n} \end{pmatrix} \begin{pmatrix} [\Delta p]^{(k+1)}_l \\ [\Delta x]^{(k+1)}_m \\ [\Delta y]^{(k+1)}_n \end{pmatrix} = \begin{pmatrix} [-H]^{(k)}_l \\ [-F]^{(k)}_m \\ [-G]^{(k)}_n \end{pmatrix} \quad (3)$$

Also, equation 4 is obtained when equation 3 is solved for $\Delta p$.

$$\left\{\left[\frac{\partial H}{\partial x}\right]^{(k)}\left[\frac{\partial F}{\partial x}\right]^{-1(k)}\left[\frac{\partial F}{\partial p}\right]^{(k)}+\right.$$

$$\left.\left[\frac{\partial H}{\partial y}\right]^{(k)}\left[\frac{\partial G}{\partial y}\right]^{-1(k)}\left[\frac{\partial G}{\partial p}\right]^{(k)}-\left[\frac{\partial H}{\partial p}\right]^{(k)}\right\}[\Delta p]^{(k+1)}=$$

$$[H]^{(k)}-\left[\frac{\partial H}{\partial x}\right]^{(k)}\left[\frac{\partial F}{\partial x}\right]^{-1(k)}[F]^{(k)}-\left[\frac{\partial H}{\partial y}\right]^{(k)}\left[\frac{\partial G}{\partial y}\right]^{-1(k)}[G]^{(k)} \quad (4)$$

Further, equation 5 is obtained from the simulator A and equation 6 from the simulator B, so that the linear variational equation for the heterogeneous coupled equation is given as equation 1.

$$\left[\frac{\partial x}{\partial p}\right]^{(k)}\equiv-\left[\frac{\partial F}{\partial x}\right]^{-1(k)}\left[\frac{\partial F}{\partial p}\right]^{(k)}, \quad [F]^{(k)}=0 \quad (5)$$

$$\left[\frac{\partial y}{\partial p}\right]^{(k)}\equiv-\left[\frac{\partial G}{\partial y}\right]^{-1(k)}\left[\frac{\partial G}{\partial p}\right]^{(k)}, \quad [G]^{(k)}=0 \quad (6)$$

As described above, as compared with the conventional coupled method (FIG. 7), the use of the locally consistent solutions obtained from the simulators A and B directly can reduce equation 3 to the linear variational equation for heterogeneous coupling of equation 1, which is in the same dimension as the heterogeneous coupled equation 6 used for the conventional noncoupled method (FIG. 6). This indicates a speed equivalent to that in the conventional noncoupled method, and a stability equivalent to that in the conventional coupled method. Consequently, a system having the feature described in (2) or (5) above is a high-speed and stable system for concurrent computing between heterogeneous simulators. Also, in forming the linear variational equation for the heterogeneous coupling according to equation 1, equation 5 is obtained by using the locally consistent solutions x+δx1, ... , x+δxm, x, which in turn are obtained by the concurrent processing with the (l+1) simulators A for the parameters p+δp1, ... , p+δpl and p. In similar fashion, equation 6 is obtained by using the locally consistent solutions y+δy1, ... , y+δyn, y, which in turn are obtained by the concurrent processing with (l+1) simulators B for the parameters p+δp1, ... , p+δpl and p. Further, the combinations of the parameter p and the variables x, y including (p+δp1, x, y), ... , (P+δpl, x, y), (p, x+δx1, y), ... , (p, x+δxm, y), (px, x, y+δy1), ... , (p, x, y+δyn), (p, x, y), are applied to (l+m+n+1) heterogeneous coupled equations and the substitutes H+δH1, ... , H obtained by the concurrent processing thereof are used to form the heterogenenous coupling variational equation 1. As described above, in the concurrent processing of (l+1) simulators A, (l+1) simulators B and (l+m+n+1) heterogeneous coupled equations 6, the required for each iterative calculation is about the same as in the conventional noncoupled method (FIG. 6), in view of the fact that the heterogeneous coupled equation 6 and the liner variational equation for heterogeneous coupling according to equation 1 are in the same dimension. In addition, since the number of iterations is about the same as in the conventional coupled method (FIG. 7), the operating speed is considerably increased. As a result, a system having the feature (2) or (5) described above is an extremely high-speed, stable system for concurrent computing between heterogeneous simulators.

Also, the linear variational equation for heterogeneous coupling according to equation 1 is formed from the locally consistent solutions xα1, xα2 and so on and yα1, yα2 and so on obtained by the concurrent processing with a plurality of the simulators A and a plurality of the simulators B and from the substitutes Hα1, Hα2 and so on obtained by the concurrent processing with a plurality of the heterogeneous coupled equations 6 with respect to a plurality of the parameters pα1, pα2 and so on (p+α1Δp, p+α2Δp and so on). In the process, only the value Hα associated with the minimum norm is selected out of Hα1, Hα2 and so on, and the heterogeneous coupling variational equation is solved thereby to produce Δp for the optimum parameter p. In the case where the value Hα associated with the minimum norm out of Hα1, Hα2 and so on is larger than the minimum norm of H in the preceding iterative calculation, α is multiplied by ⅛ and the above-mentioned process is repeated. As described above, the concurrent processing of a plurality of the simulators A, a plurality of the simulators B and a plurality of the heterogeneous coupled equations 6 can set an optimum search vector and therefore can reduce the number of iterative operations as compared with the conventional coupled method (FIG. 7). Thus an extremely high speed and a high convergence can be obtained. As a result, the system having the feature described in (3), (4) or (5) above is a system extremely high in speed and very high in stability for concurrent computing between heterogeneous simulators.

In determining two or more simulators A, B and so on including a parameter p and variables x, y and so on, and globally consistent solutions p, x, y and so on of heterogeneous coupled equations correlating the parameter p and the variables x, y and so on, on the other hand, the linear variational equation for the heterogeneous coupling according to equation 2 is set in the numerical calculation unit for the heterogeneous coupling variational equation. The simulator engineer can produce a higher speed than in the conventional noncoupled method (FIG. 6) and a higher convergence than in the conventional coupled method (FIG.

7) simply by setting a heterogeneous coupled equation. Therefore, the system having the feature of (6) or (7) above is an extremely high-speed, a very stable system having a high scalability for concurrent computing between heterogeneous simulators.

BRIEF DESCRIPTION OF THE DRAWINGS

FIG. 17 is a PAD diagram showing the processing steps of the calculation control unit 7 including the optimum search vector setting unit 13 in FIG. 3.

DESCRIPTION OF THE PREFERRED EMBODIMENTS

Figure 14:
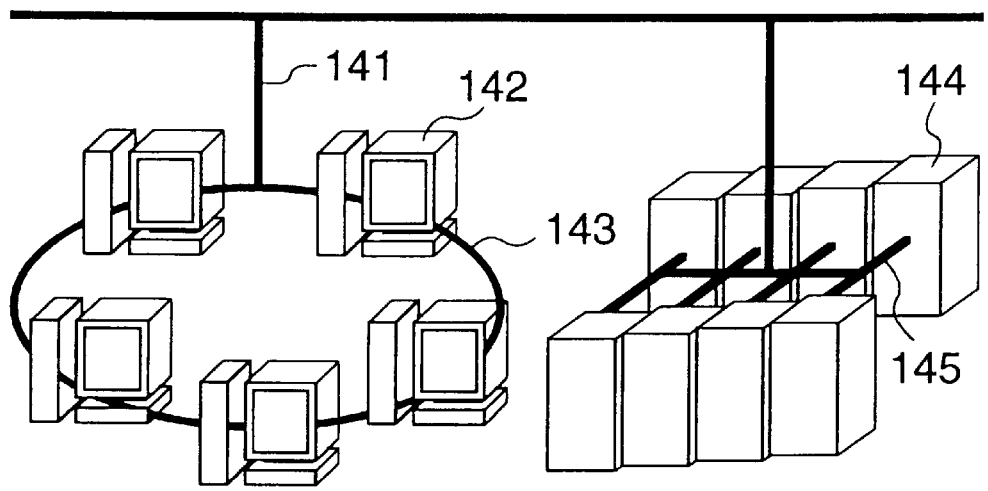
FIG. 14 is a diagram showing a system configuration in an environment of executing the concurrent computing between heterogeneous simulators.
Figure 15:
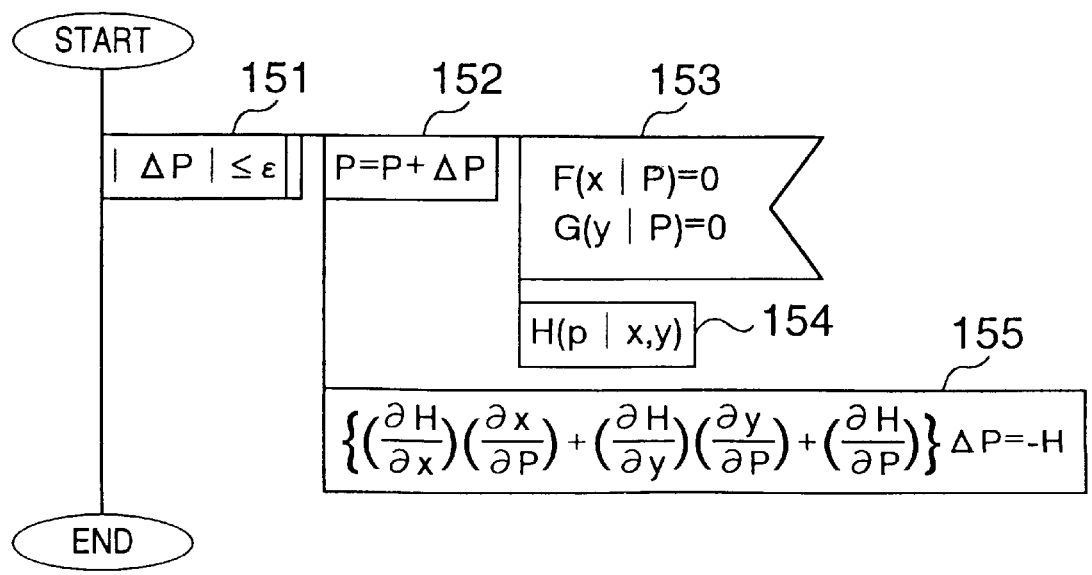
FIG. 15 is a PAD diagram showing the processing steps of the calculation control unit 7 in FIG. 1.

FIG. 14 shows an environment for executing the concurrent computing between heterogeneous simulators. This represents an environment for concurrent operation in coordination between heterogeneous simulators implemented in a network comprising hardware such as a cluster 143 of a plurality of work stations 142 connected to an Ethernet 141 and a massively parallel computer 144 including a multiplicity of RISC processors connected to an intracompany communication bus 145.

Figure 1:
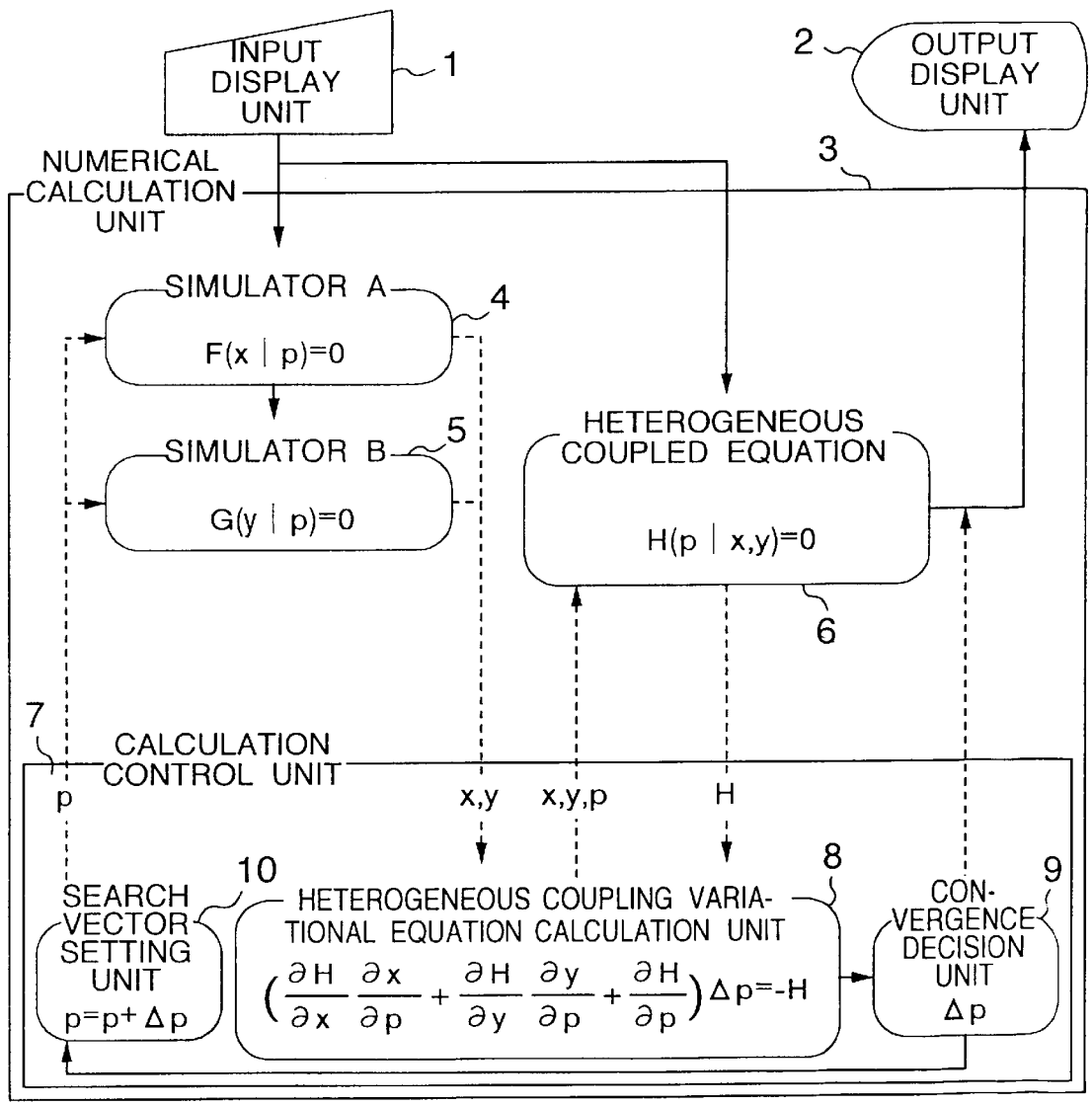
FIG. 1 is a block diagram showing a system for concurrent computing between heterogeneous simulators, comprising a calculation control unit 7 according to the present invention.

FIG. 1 is a block diagram showing a configuration of a system for concurrent computing between heterogeneous simulators according to a first embodiment of the invention.

Figure 6:
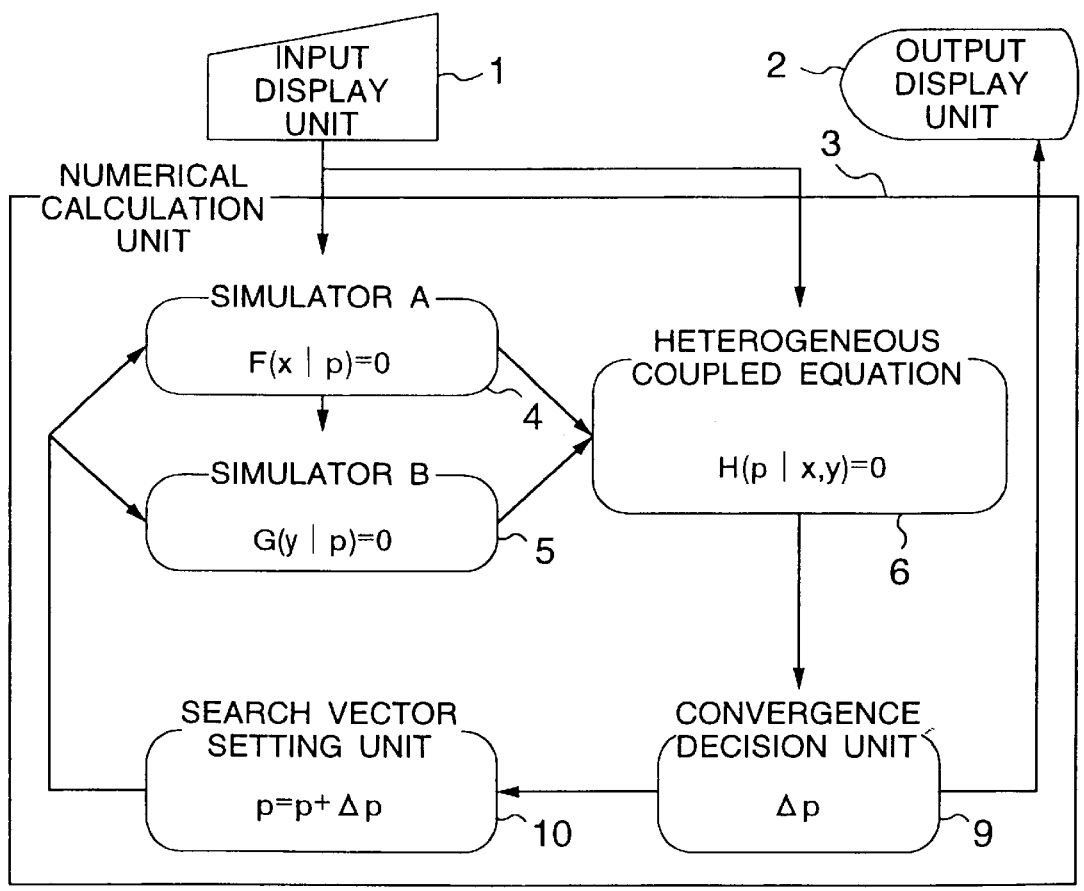
FIG. 6 is a system block diagram including the conventional noncoupled method.
Figure 7:
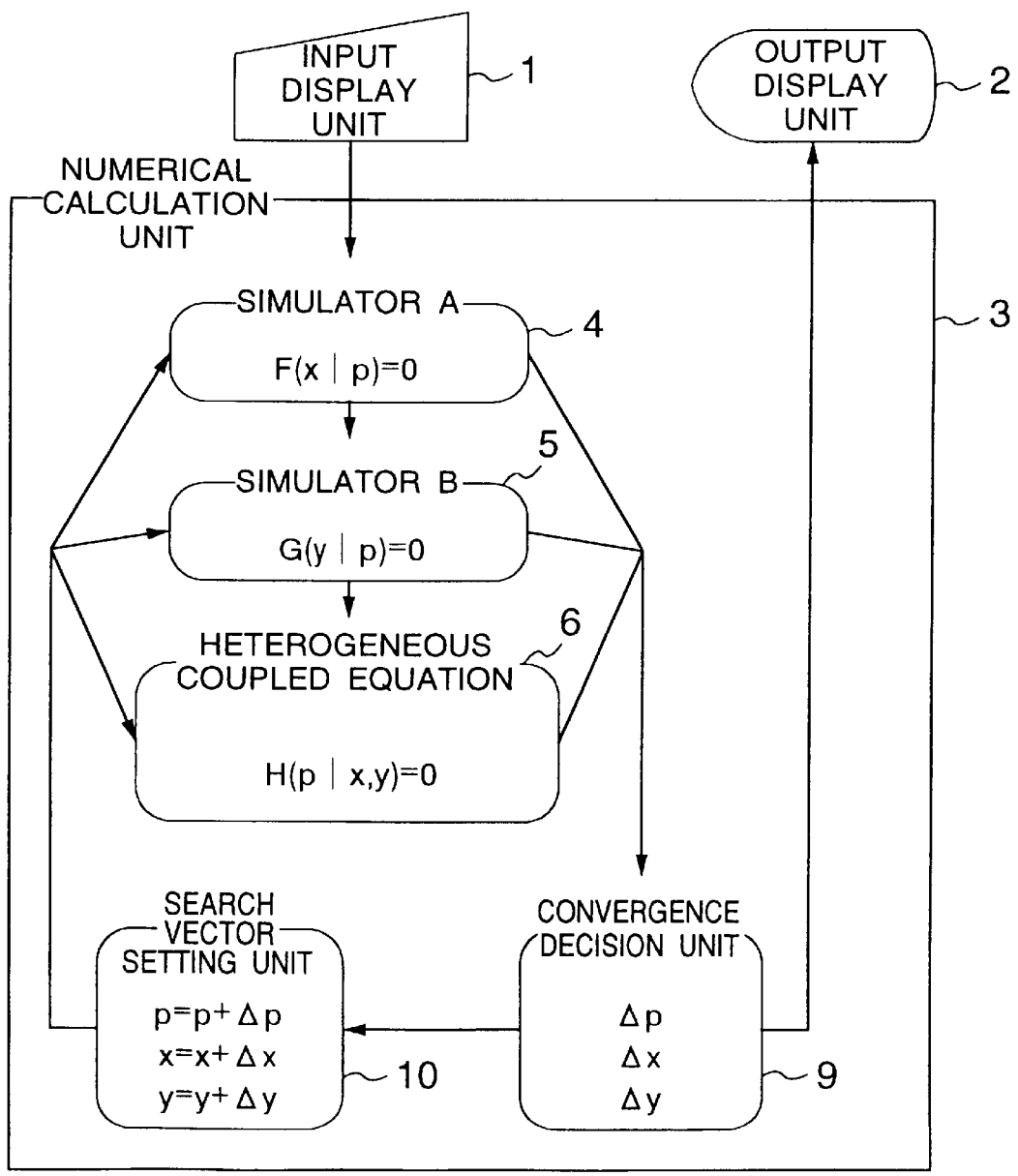
FIG. 7 is a system block diagram including the conventional coupled method.

In this embodiment, a simulator A including a parameter p and a variable x, a simulator B including the parameter p and a variable y are set together with the parameter p in a numerical calculation unit 3 through an input display unit 1. The numerical calculation unit 3 executes the calculation operation on the basis of a simulator program and determines self-consistent solutions x, y of the nonlinear simultaneous equations formed of the parameter p. The variables x, y are displayed in the form of data or graphics on the output display unit 2. Now, assume that a physical phenomenon is so complicated to such an extent as to form a heterogeneous coupled equation correlating the parameter p and the variables x, y. A heterogeneous coupled equation 6 is set again in the numerical calculation unit 3 through the input display unit 1 to determine globally consistent solutions p, x, y. According to the present embodiment, the numerical calculation unit 3 includes a calculation control unit 7 having a heterogeneous coupling variational equation calculation unit 8, a convergence decision unit 9 for the parameter p, and a search vector setting unit 10 for the parameter p. The heterogenous coupling variational equation calculation unit 8 retrieves a locally consistent solution x obtained from the simulator A and a locally consistent solution y obtained from the simulator B for the parameter p. Also, the numerical calculation unit 8 applies the parameter p and the variables x, y to the heterogeneous coupled equation 6 and retrieves the substitute H. The linear variational equation for heterogeneous coupling according to equation 1 formed of the values of the parameter p, the variables x, y and H is solved thereby to determine the increment Δp of the parameter p. The convergence decision unit 9 decides on the convergence of Δp. In the absence of convergence, the search vector setting unit 10 sets a new parameter p by increasing the preceding parameter by Δp and repeats the steps for retrieving locally consistent solutions from the simulators. In the presence of convergence, on the other hand, the output display unit 2 can display the values of the globally consistent solutions p, x, y. The linear variational equation for heterogeneous coupling according to equation 1 is equivalent to equation 3 for the conventional stable coupled method shown in FIG. 7. In addition, it is in the same dimension as the heterogeneous coupled equation 6 for the conventional noncoupled method shown in FIG. 6. Therefore, this system is a high-speed, stable system for concurrent computing between heterogeneous simulators.

Figure 3:
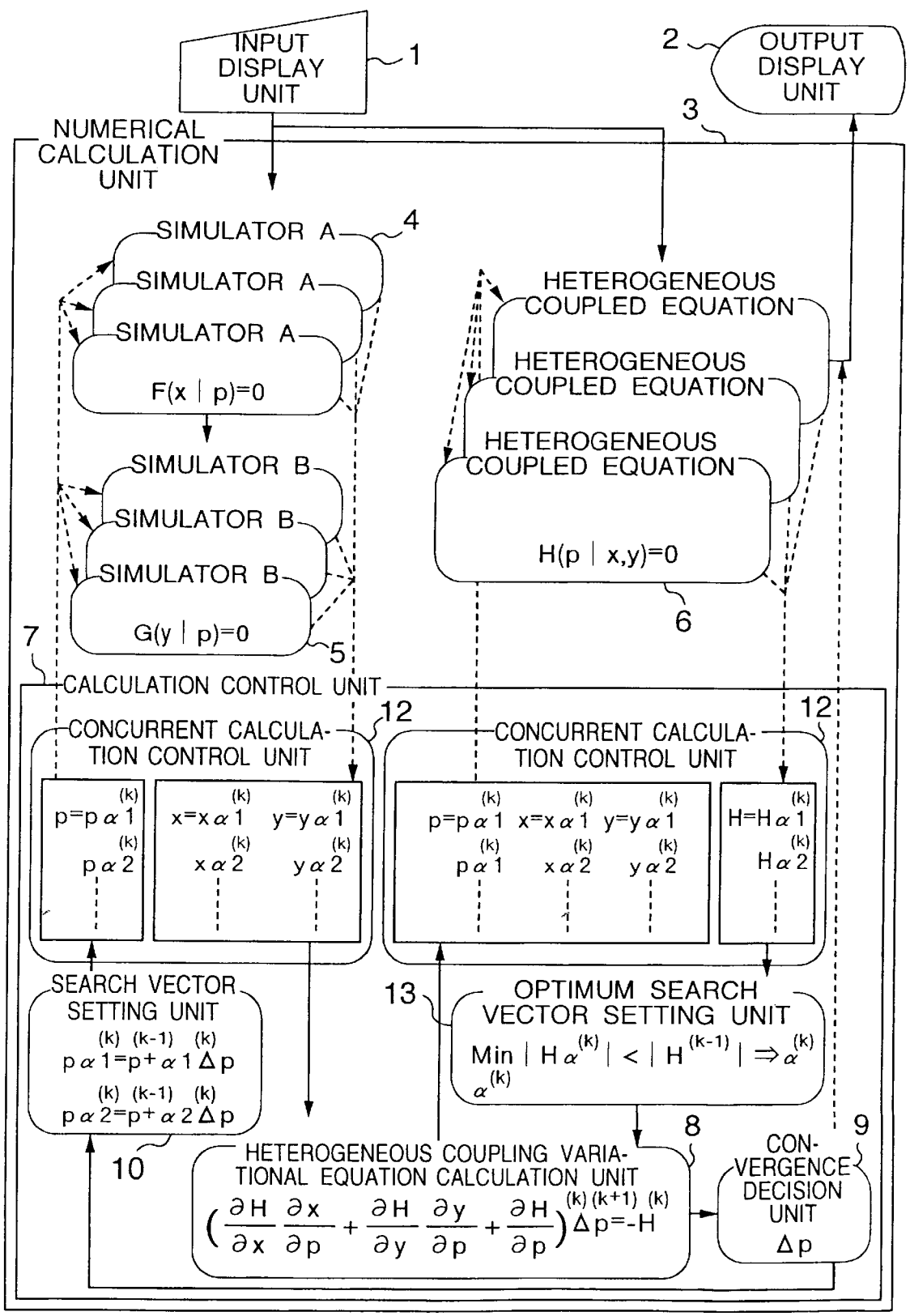
FIG. 3 is a block diagram showing a system for concurrent computing between heterogeneous simulators, comprising a concurrent calculation control unit 12 and an optimum search vector setting unit 13 according to the present invention.

The processing steps for a calculation control unit of a numerical calculation unit 3 according to this invention is shown in FIG. 3 (block 1). The steps of processing (block 152) for setting a new parameter p are repeated until the increment Δp of the parameter p converges (block 151). For the value Δp to be obtained, first, the nonlinear simultaneous equations F(x¦p)=0 of the simulator A are solved for the parameter p thereby to obtain a locally consistent solution x (block 153), the nonlinear simultaneous equations G(y¦p)=0 of the simulator B are solved to determine a locally consistent solution y (block 153), and the parameter p and the variables x, y are substituted into H (p¦x, y) of the heterogeneous coupled equation 6 thereby to determine the value H (block 154). After that, the step (block 155) is executed for solving the linear variational equation for heterogeneous coupling formed of the parameter p, the variables x, y and the value H thereby to determine Δp.

Figure 2:
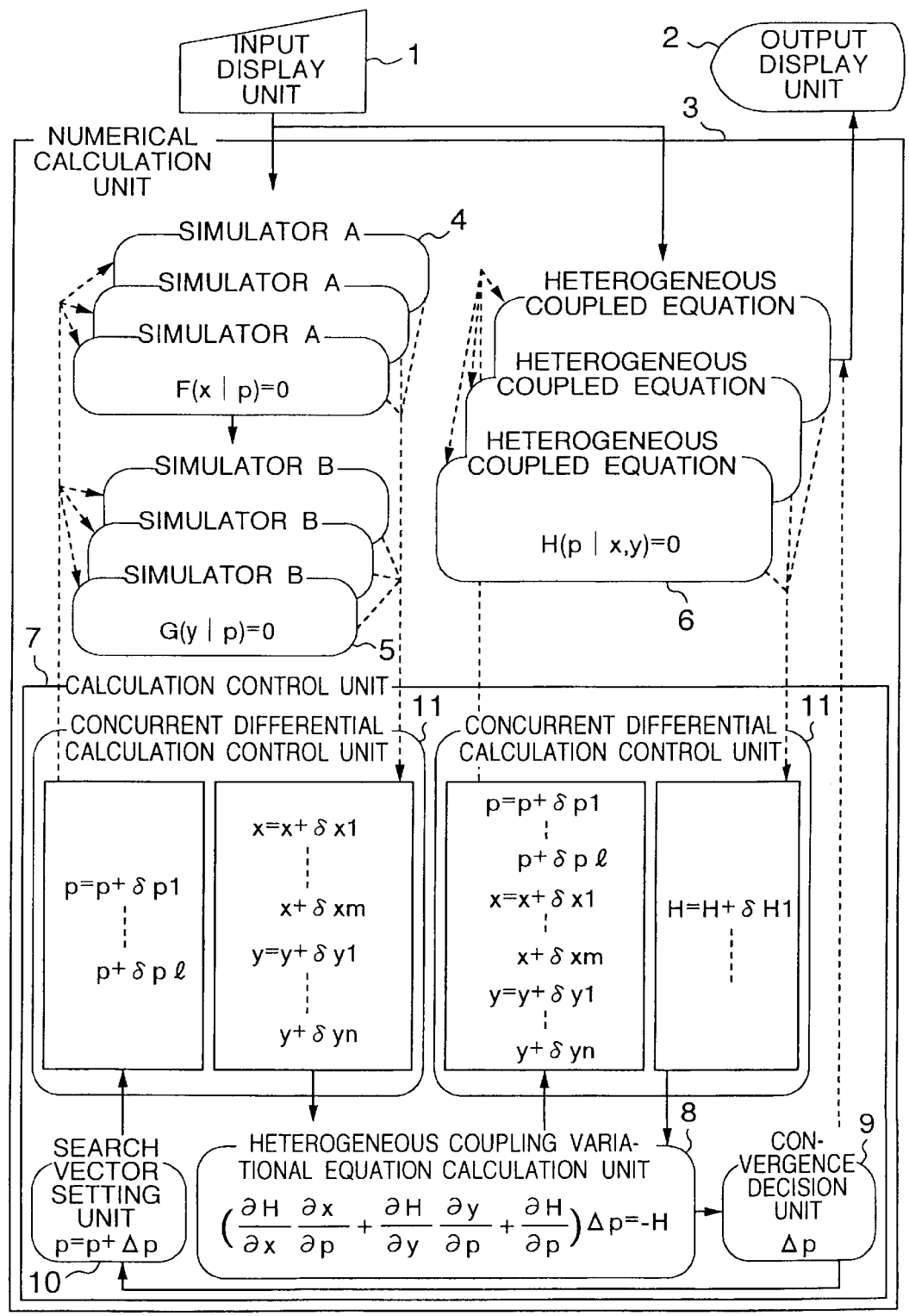
FIG. 2 is a block diagram showing a system for concurrent computing between heterogeneous simulators, comprising a concurrent differential calculation control unit 11 according to the present invention.

FIG. 2 is a block diagram showing a system for concurrent computing between heterogeneous simulators according to a second embodiment of the invention.

According to this embodiment, the calculation control unit according to the first embodiment shown in FIG. 1 includes a concurrent differential calculation control unit 11.

The concurrent differential calculation control unit 11 sets p+δp1, . . . , p+δpl, together with p, by modulating the infinitesimal amounts δp1, . . . , δpl with the parameter p (p1, . . . , pl). Also, (l+1) simulators A and (l+1) simulators B are set in the numerical calculation unit 3. Then, the parameters p+δp1, . . . , p+δpl and p thus set are applied to the (l+1) simulators A and the (l+1) simulators B, the locally consistent solutions x+δx1, . . . , x+δxm, x and y+δy1, . . . , y+δyn, y obtained by concurrent processing are retrieved thereby to form (∂x/∂p)m×l and (∂y/∂p)n×l, which are applied to the heterogeneous coupling variational equation calculation unit 8.

The heterogeneous coupling variational equation calculation unit 8 sets the parameters p+δp1, . . . , p+δpl, p, the variables x+δx1, . . . , x+δxm, x and the variables y+δy1, . . . , y+δyn, y again in the concurrent differential calculation control unit 11.

The concurrent differential calculation control unit 11 sets combinations of the parameter p and the variables x, y including (p+δp1, x, y), . . . , (p+δpl, x, y), (p, x+δx1, y), . . . , (p, x+δxm, y), (p, x, y+δy1), . . . , (p, x, y+δyn), (p, x, y). Also, the (δ+m+n+1) heterogeneous coupled equations 6 are set in the numerical calculation unit 3. The combinations of the parameter p and the variables x, y thus set are applied to the (l+m+n+1) heterogeneous coupled equations 6, and the concurrently processed values of H including H+δH1, . . . , H are retrieved thereby to form (∂H/∂x)l×m, (∂H/∂y)l×n, (∂H/∂p)l×l, which are applied to the heterogeneous coupling variational equation calculation unit 8. The linear variational equation for heterogeneous coupling according to equation 1 formed of these values of (∂x/∂p)m×l, (∂y/∂p)n×l, (∂H/∂x)l×m, (∂H/∂y)l×n, (∂H/∂p) and H is solved thereby to obtain the increment Δp of the parameter p. In the process, if the (l+1) simulators A, the (l+1) simulators B and the (l+m+n+1) heterogeneous coupled equations 6 are concurrently processed, the time required for each iteration is substantially the same as in the conventional noncoupled method, in view of the fact that the linear variational equation for heterogeneous coupling according to equation 1 is in the same dimension as the heterogeneous coupled equation 6. In addition, since the number of iterations is almost the same as in the conventionally stable coupled method, the system according to this embodiment is an extremely high-speed, stable system for concurrent computing between heterogeneous simulators.

Figure 16:
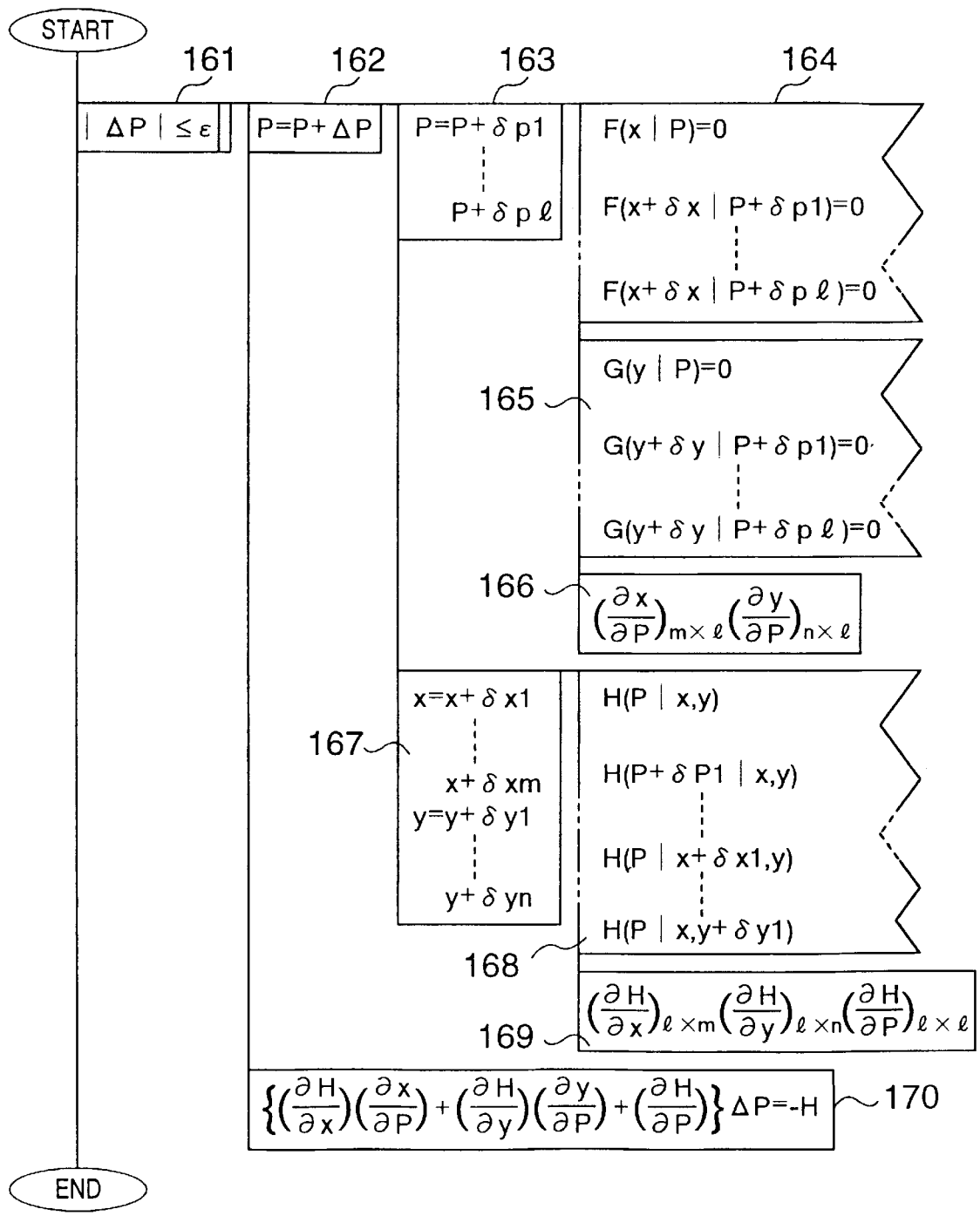
FIG. 16 is a PAD diagram showing the processing steps of the calculation control unit 7 including the concurrent differential calculation control unit 11 in FIG. 2.

The processing steps for the numerical calculation unit 3 including the concurrent differential calculation control unit according to the invention are shown in FIG. 16. A new parameter p is set (block 162) by increasing the increment Δp of the prevailing parameter p until the increment Δp converges (block 161). This step is repeated. For Δp to be obtained, the first step is to set p+δp1, . . . , p+δpl and p by modulating the parameter p (p1, . . . , pl) by infinitesimal amounts δp1, . . . , δpl (block 163). The nonlinear simultaneous equations F(x¦p)=0 with (l+1) simulators A and the nonlinear simultaneous equations G(y¦p)=0 with the (l+1) simulators B are solved by concurrent processing for the parameter p+δp1, . . . , p+δpl and p thus set thereby to execute the process (blocks 164, 165) for producing the locally consistent solutions x+δx1, . . . , x+δxm, x and y+δy1, . . . , y+δyn, y and the process (block 166) for forming (∂x/∂p)m×l and (∂y/∂p)n×l.

Then, combinations of the parameter p and the variables x, y including (p+δp1, x, y), . . . , (p+δpl, x, y), (p, x+δx1, y), . . . , (p, x+δxm, y), (p, x, y+δy1), . . . , (p, x, y+δyn), (p, x, y) are set (block 167). The combinations of the parameter p and the variabls x, y thus set are substituted into H(p¦x, y) of (l+m+n+1) heterogenous coupled equations thereby to execute the step (block 168) for producing H+δH1, . . . , H and the step (block 169) for forming (∂H/∂x)l×m, (∂H/∂y) l×n and (∂H/∂p)l×l.

The step (block 170) is executed for solving the linear variational equation for heterogeneous coupling according to equation 1 formed by the values of (∂x/∂p)m×l, (∂y/∂p) n×l, (∂H/∂x)l×m, (∂H/∂y)l×n, (∂H/∂p) and H thereby to produce Δp.

FIG. 3 is a block diagram showing a configuration of a system for concurrent computing between heterogeneous simulators according to a third embodiment of the invention.

This embodiment is equivalent to the first embodiment shown in FIG. 1 in which the calculation control unit further includes a concurrent calculation control unit 12 and an optimum search vector setting section 13.

Figure 4:
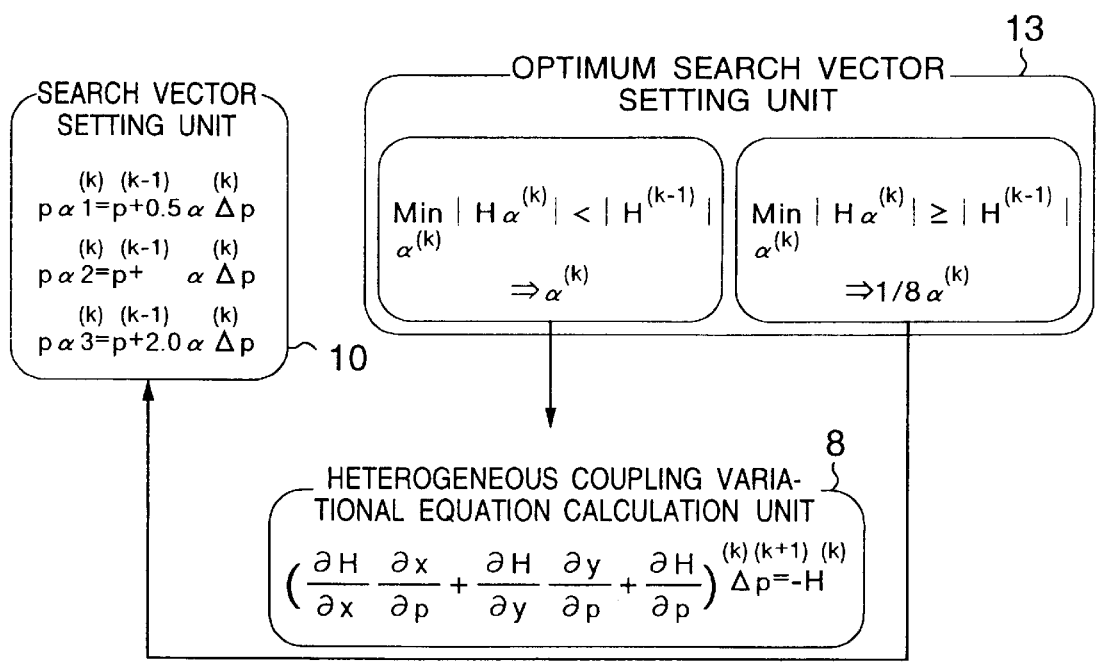
FIG. 4 is a block diagram showing a system for concurrent computing between heterogeneous simulators, comprising an optimum search vector setting unit 13 and a search vector setting unit 10 according to the present invention.

The search vector setting unit 10 sets new parameters pα1, pα2, and so on, i.e., p+α1Δp, p+α2Δ p and so on including a plurality of increment coefficients α(α1, α2, and so on) for the increment Δp of the parameter p in the concurrent calculation control unit 12. Also, as shown in FIG. 4, three increment coefficients 0.5α, α, 2.0α are set on the basis of the value α(0<α<1).

The concurrent calculation control unit 12 sets a plurality of simulators A and a plurality of simulators B in the numerical calculation unit 3. Then, the parameters pα1, pα2 and so on are applied to a plurality of the simulators A and a plurality of the simulators B, so that the locally consistent solutions xα1, xα2 and so on and yα1, yα2 and so on obtained by concurrent processing are retrieved and applied to the numerical calculation unit 8 for the heterogeneous coupling variational equation.

The numerical calculation unit 8 of the heterogeneous coupling variational equation sets the parameters pα1, pα2 and so on, and the variables xα1, xα2 and so on, and yα1, yα2 and so on, again in the concurrent calculation control unit 12.

The concurrent calculation control unit 12 sets the combinations of the parameter p and the variables x, y including (pα1, xα1, yα1), (pα2, xα2, yα2), and so on. Also, a plurality of heterogeneous coupled equations 6 are set in the numerical calculation unit 3. The combinations of the parameter p and the variables x, y including (pα1, xα1, yα1), (pα2, xα2, yα2) and so on thus set are applied to a plurality of the heterogeneous coupled equations 6, and the concurrently processed values of H including Hα1, Hα2 and so on, are retrieved and applied to the optimum search vector setting unit 13.

The optimum search vector unit 13 applies the value Hα associated with a minimum norm among Hα1, Hα2 and so on, which is smaller than the minimum norm of H in the preceding iterative calculation to the numerical calculation unit 8 for the heterogeneous coupling variational equation.

The numerical calculation unit 8 for the heterogeneous coupling variational equation solves only the linear variational equation for heterogeneous coupling according to equation 1 formed from the parameter pα, the variables xα, yα, and the H value Hα for the set value α thereby to produce the increment Δp of the optimum parameter p. Also, as shown in FIG. 4, in the case where the value Hα associated with a minimum norm among Hα1, Hα2 and so on is smaller than the minimum norm of H in the preceding iterative calculation, the value α is multipled by ⅛ in order to reduce the nonlinearity, and then the above-mentioned process is repeated. The superscripts "k" shown in FIG. 3 indicate the value for the k-th iteration. If a plulrality of the simulators A, a plurality of the simulators B and a plurality of the heterogeneous coupled equations 6 are concurrently processed, an optimum search vector is set and the number of iterations can thus be reduced thereby to produce an extremly high speed and a high convergence as compared with the coupled method of the prior art. As a result, this system is an extremely high-speed, very stable system for concurrent computing between heterogeneous simulators.

The processing steps for the concurrent calculation control unit and the optimum vector setting unit in the calculation control unit of the numerical calculation unit 3 according to the invention are shown in FIG. 17. A new parameter p is set by increasing the increment Δp of the parameter p until the increment Δp converges (block 171), and this step is repeated. In order to obtain Δp, first, new parameters pα1, pα2 and so on (p+α1Δp, p+α2Δp and so on) including a plurality of increment coefficients α (α1, α2 and so on) are set for the increment Δp of the parameter p (block 172). Then, the process (blocks 173, 174) is executed in which the nonlinear simultaneous equations F(x|p)=0 with a plurality of the simulators A and the nonlinear simultaneous equations G(y|p)=0 with a plurality of the simulators B for the parameters pα1, pα2 and so on are solved by concurrent procesing thereby to produce the locally consistent solutions xα1, xα2 and so on and yα1, yα2 and so on.

Next, the step (block 175) is executed in which the combinations of the parameter p and the variables x, y including (pα1, xα1, yα1), (pα2, xα2, yα2), and so forth are substituted into H(p|x, y) of a plulrality of the heterogeneous coupled equations 6 thereby to obtain Hα1, Hα2 and so forth.

Among the values Hα1, Hα2 and so forth, a value Hα associated with the minimum norm smaller than the minumum value of the norm of H in the preceding iterative calculation is selected (block 176). The step (block 178) is executed for solving the linear variational equation for heterogeneous coupling according to equation 1 formed of the parameter pα, the variabls xα, yα and the value Hα for the sete value α thereby to produce the increment Δp of the optimum parameter p. Also, in the case where the value Hα among Hα1, Hα2 and so forth, associated with the minimum norm is larger than the minimum norm of H in the preceding iterative calculation (block 177), the value α is reduced to ⅛ (block 179) for reducing the nonlinearity. This process then is repeated.

Figure 5:
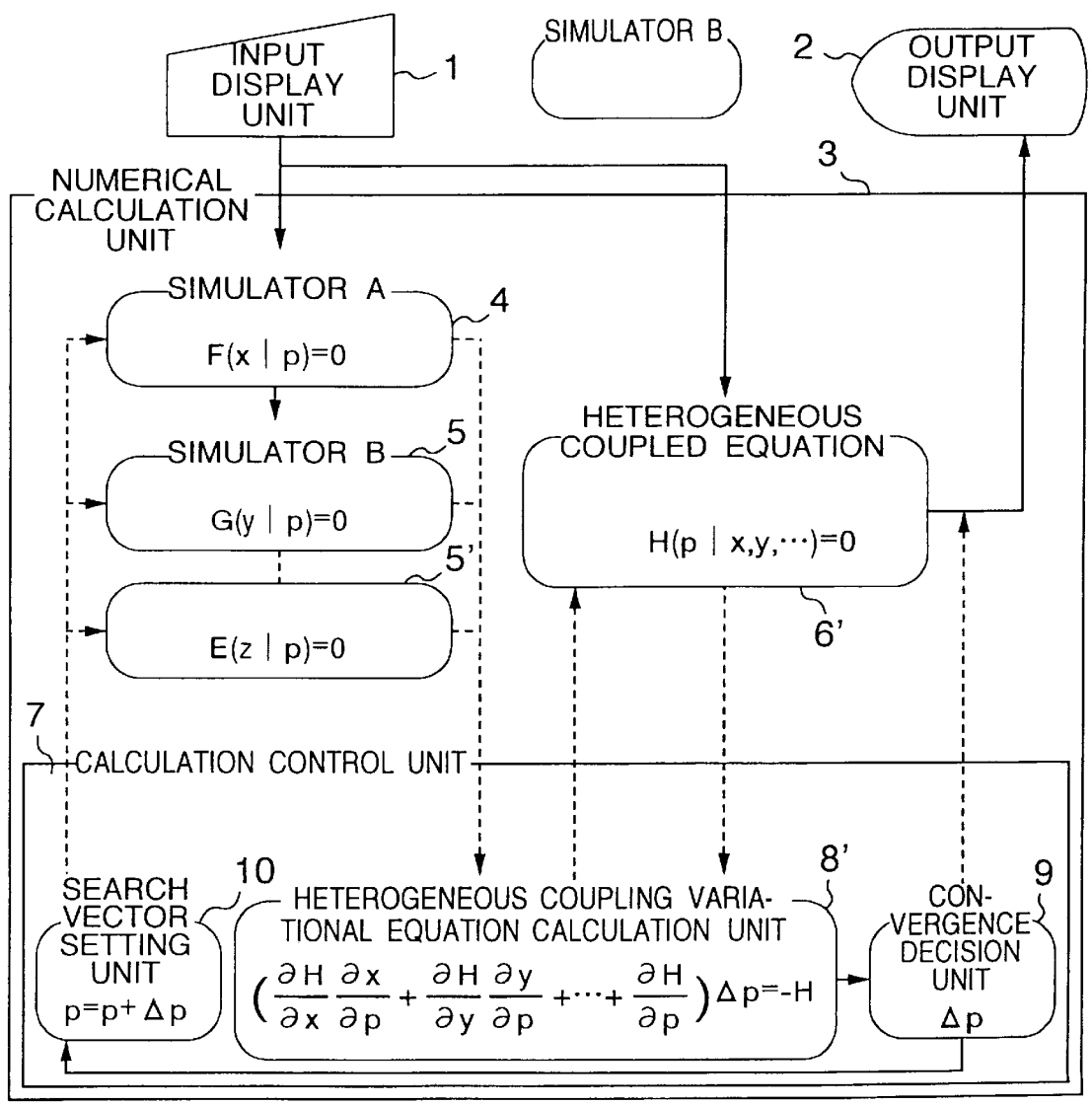
FIG. 5 is a block diagram showing a system for concurrent computing between heterogeneous simulators, comprising an enlarged heterogeneous coupling variational equation calculation unit 8' according to the present invention.

FIG. 5 is a block diagram showing a system for concurrent computing between heterogeneous simulators according to a fourth embodiment of the invention.

According to this embodiment, heterogeneous simulators 4, 5 and other simulators 5' and so forth including the parameter p and the variables x, y and so on and a heterogeneous coupled equation 6' correlating the parameter p and the variables x, y, z, and so on are set in the numerical calculation unit 3 from the input display unit 1. Also, a variational equation corresponding to the heterogeneous coupled equation 6' is set in the numerical calculation unit 8'.

The heterogeneous coupling variational calculation unit 8' forms a linear variational equation for the heterogenerous coupled equation according to equation 2 and determines the increment Δp of the parameter p thereby to produce the globally consistent solutions p, x, y. In the process, the simulation engineer can obtain a higher speed than the conventional noncoupled method and a higher convergence than the conventional coupled method simply by seting the heterogeneous coupling variation equation 8' of equation 2 anew. Consequently, the present system is an extremely high-speed, very stable system with a very high scalability for concurrent computing between heterogeneous simulators.

Figure 8:
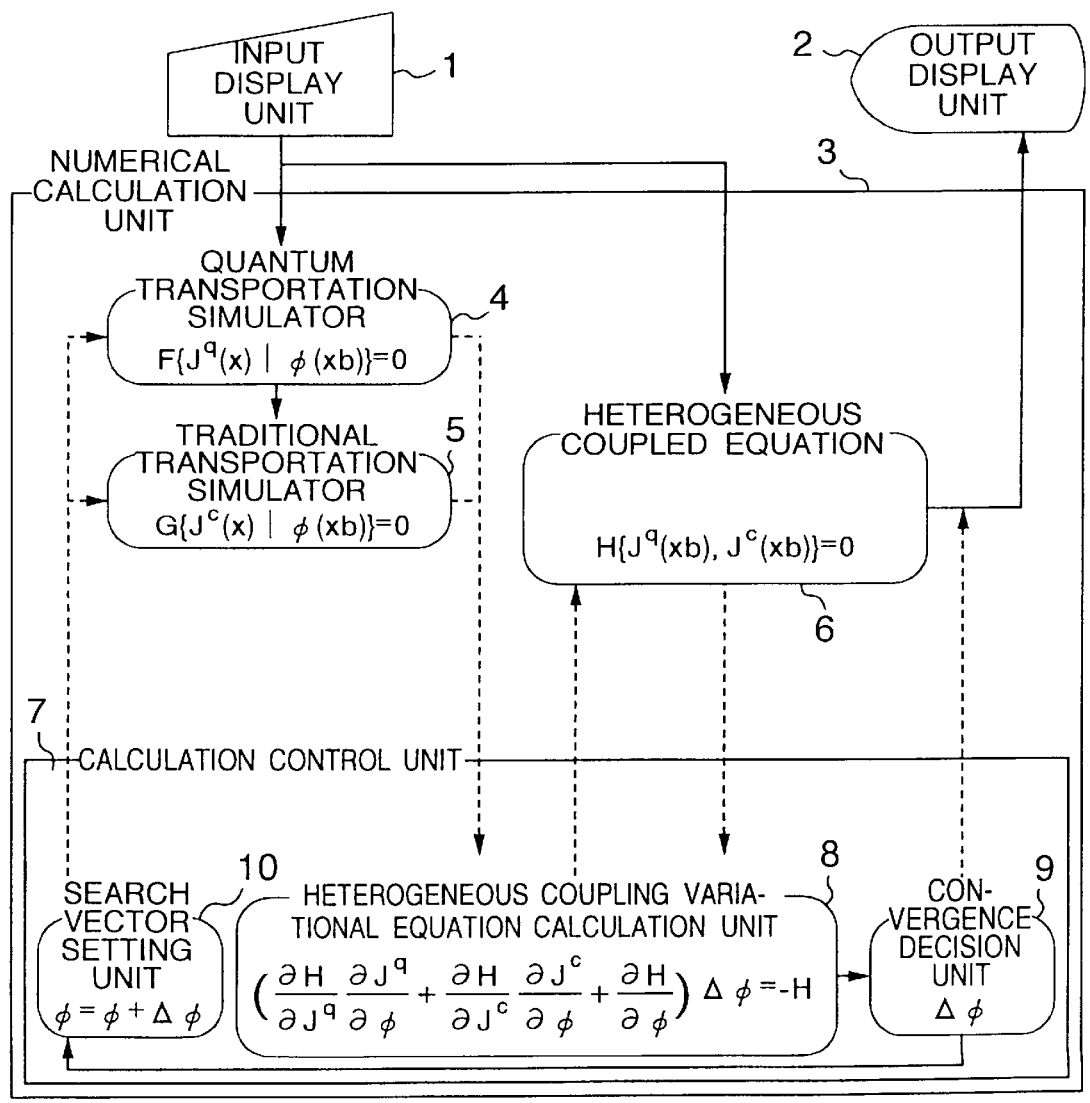
FIG. 8 is a block diagram showing a system comprising the calculation control unit 7 for concurrent computing between a quantum transportation simulator and a traditional transportation simulator for nanometric device simulation according to the present invention.

FIG. 8 is a block diagram showing a simulation of a nanometric device of a system for concurrent computing between heterogeneous simulators according to a fifth embodiment of the invention.

According to this embodiment, a quantum transportation simulator 4 and a traditional transportation simulator 5 are set in the numerical calculation unit 3. The numerical calculation unit 3 executes the calculation process according to a simulation program and determines self-consistent solutions for the variables of nonlinear simultaneous equations. These variables are displayed on an output display unit 2 in the form of data or graphics.

Figure 12:
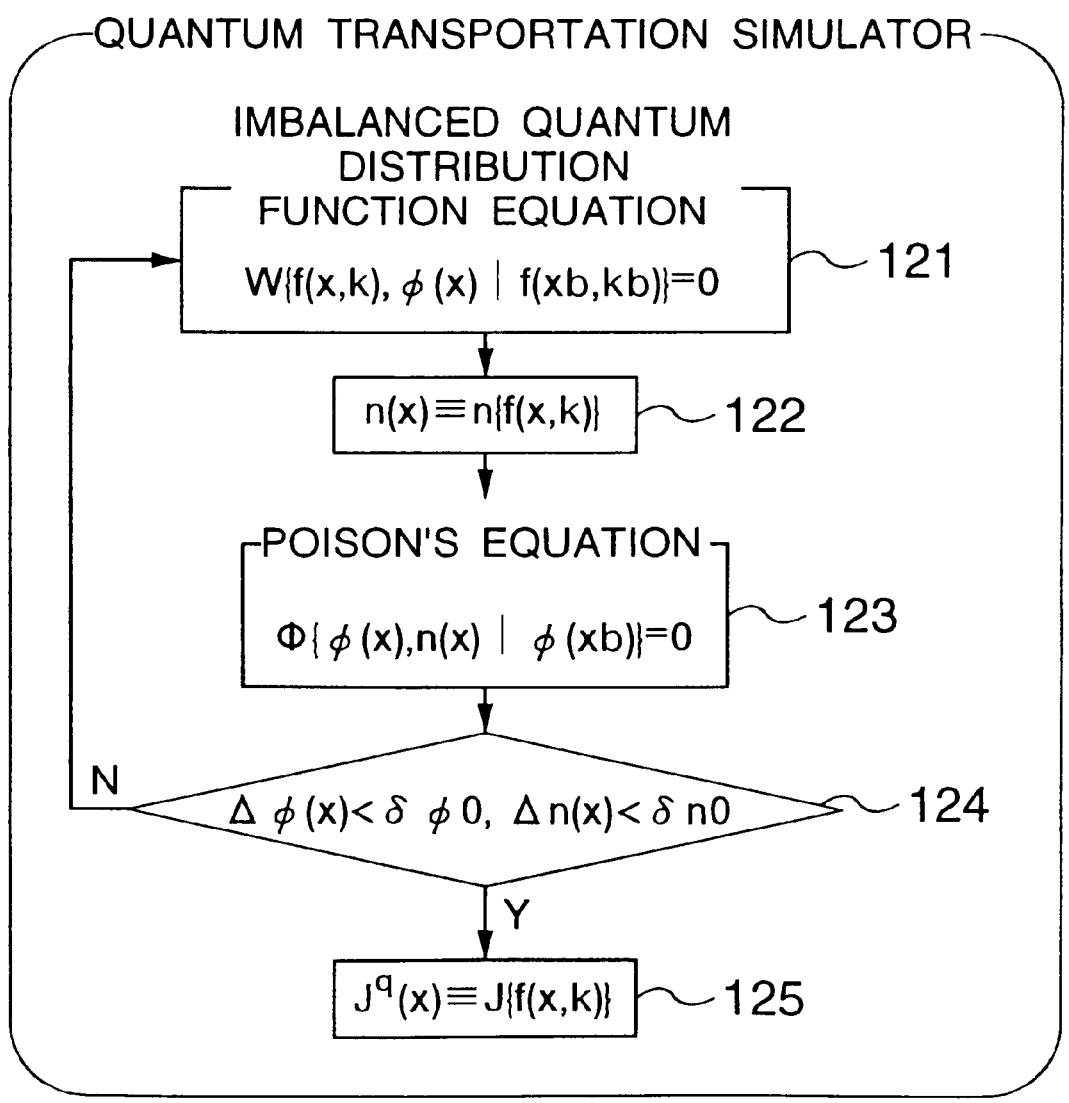
FIG. 12 is a flowchart showing the processing steps for a quantum transportation simulator.
Figure 13:
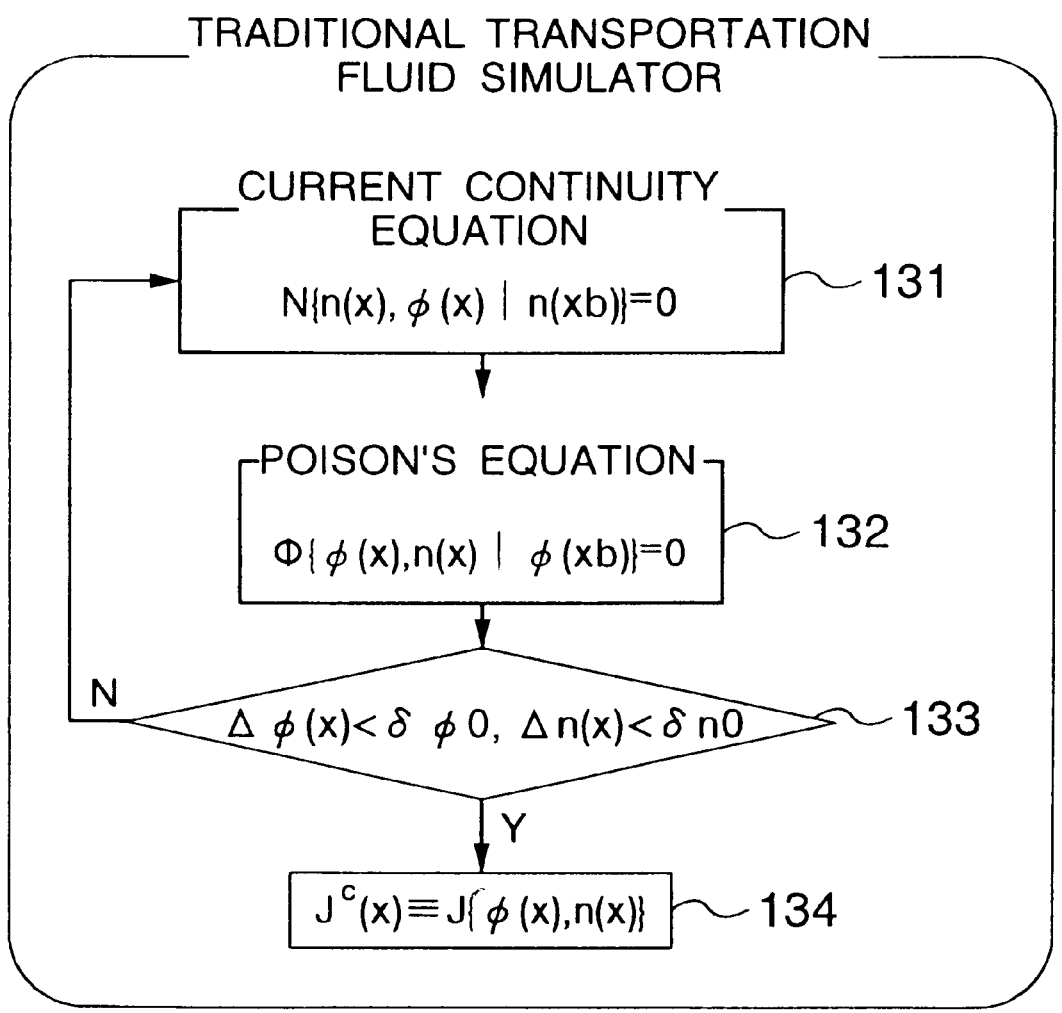
FIG. 13 is a flowchart showing the processing steps for a traditional transportation simulator.

In a nanometric device, substantially all the domains including the electrodes are located in an applicable range of the general traditional transportation simulator 5. In the infinitesimal domains of a nanometric structure, however, the quantum transportation simulator 4 including the tunnel effect or the like is required to be applied. The quantum transportation simulator 4 is described in detail in the flowchart of FIG. 12. First, a quantum distribution function f(x, k) for a potential φ(x) is determined based on an imbalanced quantum distribution funtional equation W and a quantum distribution function f(xb, kb) constituting a boundary condition (block 121). Then, the potential φ (x) is obtained (block 123) for the electron density n(x) (block 122) from the quantum distribution function f(x, k) on the basis of the potential φ(xb) for the boundary condition and the Poison's equation φ. This process is repeated ntil the convergence conditions are met for both the increment Δn(x) and the increment Δφ(x) of the electron density and the potential (block 124). If the convergence conditions are met, a current density Jq(x) is obtained from the quantum distribution function f(x, k) providing a self-consistent solution (block 125). The traditional transportation simulator 5 is shown in detail in the flowchart of FIG. 13. First, on the basis of the electron density n(xb) of the bondary conditions and the current continuity equation N, the electron density n(x) for the potential φ(x) is obtained (block 131). Then, the potential φ(x) for the electron density n(x) is determined on the basis of the potential φ(xb) for the boundary conditions of the Poison's equation as in the case of the quantum transportation simulator 4 (block 132). This process is repeated until both the increments Δφ(x) and Δn(x) of the potential and the electron density, respectively, and come to satisfy the convergence conditions (block 133). Once the convergence conditions are met, the current density Jx(x) can be obtained from the potential φ(x) and the electron density n(x) providing self-consistent solutions (block 134).

In the case where means is selected for using the quantum transportation simulator 4 including the parameter (xb) and the variable Jq(x) and the traditional transportation simulator 5 including the parameter φ(xb) and the variable Jc(x) in proper way and at proper time, then, a heterogeneous coupled equation according to equation 7 can be formed for guaranteeing the current continuity for the the current density Jq(xb) obtained from the quantum transportation simulator 4 and the current density Jc(xb) obtained from the traditional transportation simulator 5 in the boundary domain xb. The heterogeneous coupled equation 6 is set again in the numerical calculation unit 3 through the input display unit 1 thereby to determine globally consistent solutions f(x), Jq(x), Jc(x).

$$H\{J^q(xb), J^c(xb)\} = J^c(xb) - J^q(xb) = 0 \tag{7}$$

According to the present invention, as shown in FIG. 8, the numerical calculation unit 3 includes a calculation control unit 7 having a heterogeneous coupling variational equation calculation unit 8, a convergence decision unit 9 for the parameter p and a search vector setting unit 10 for the parameter p. The heterogeneous coupling variational equation calculation unit 8 retrieves the locally consistent solution Jq(x) obtained from the quantum transporation simulator 4 and the locally consistent solution Jc(x) obtained from the traditional transportation simulator 5 for the parameter φ(xb). Also, the numerical calculation unit 8 retrieves the value H of Jc(xb)−Jq(xb) by applying the parameter φ(xb) and the variables Jq(x), Jc(x) to the heterogeneous coupled equation 6. The linear variational equation for heterogeneous coupling according to equation 8 formed of the parameter φ(xb), the variables Jq(x), Jc(x) and the value H of Jc(xb)−Jq(xb) is solved thereby to determine the increment Δφ(xb) of the parameter φ(xb).

$$\left(\frac{\partial H}{\partial J^q}\frac{\partial J^q}{\partial \phi} + \frac{\partial H}{\partial J^c}\frac{\partial J^c}{\partial \phi} + \frac{\partial H}{\partial \phi}\right)^{(k)} \Delta\phi^{(k+1)} = -H^{(k)} \tag{8}$$

The convergence decision unit 9 decides on the convergence of the increment Δφ(xb). In the absence of convergence, the process is repeated in which the search vector setting unit 10 sets a new parameter φ(xb) by increasing the prevailing parameter by Δf(xb), and retrieves the locally consistent solutions from the simulators. In the presence of convergence, on the other hand, the values of the globally consistent solutons φ(x), Jq(x), Jc(x) can be displayed on the output display unit 2. This system is equivalent to the conventional stable coupled method. In addition, in view of the fact that the linear variation equation for heterogeneous coupling according to equation 8 can be shown in the same dimension as the heterogeneous coupled equation H6 in the conventional noncoupled method, this system is considered a high-speed, stable system for concurrent compuing between a quantum transportation simulator for a nanometric device simuation and a traditional transportation simulator.

Figure 9:
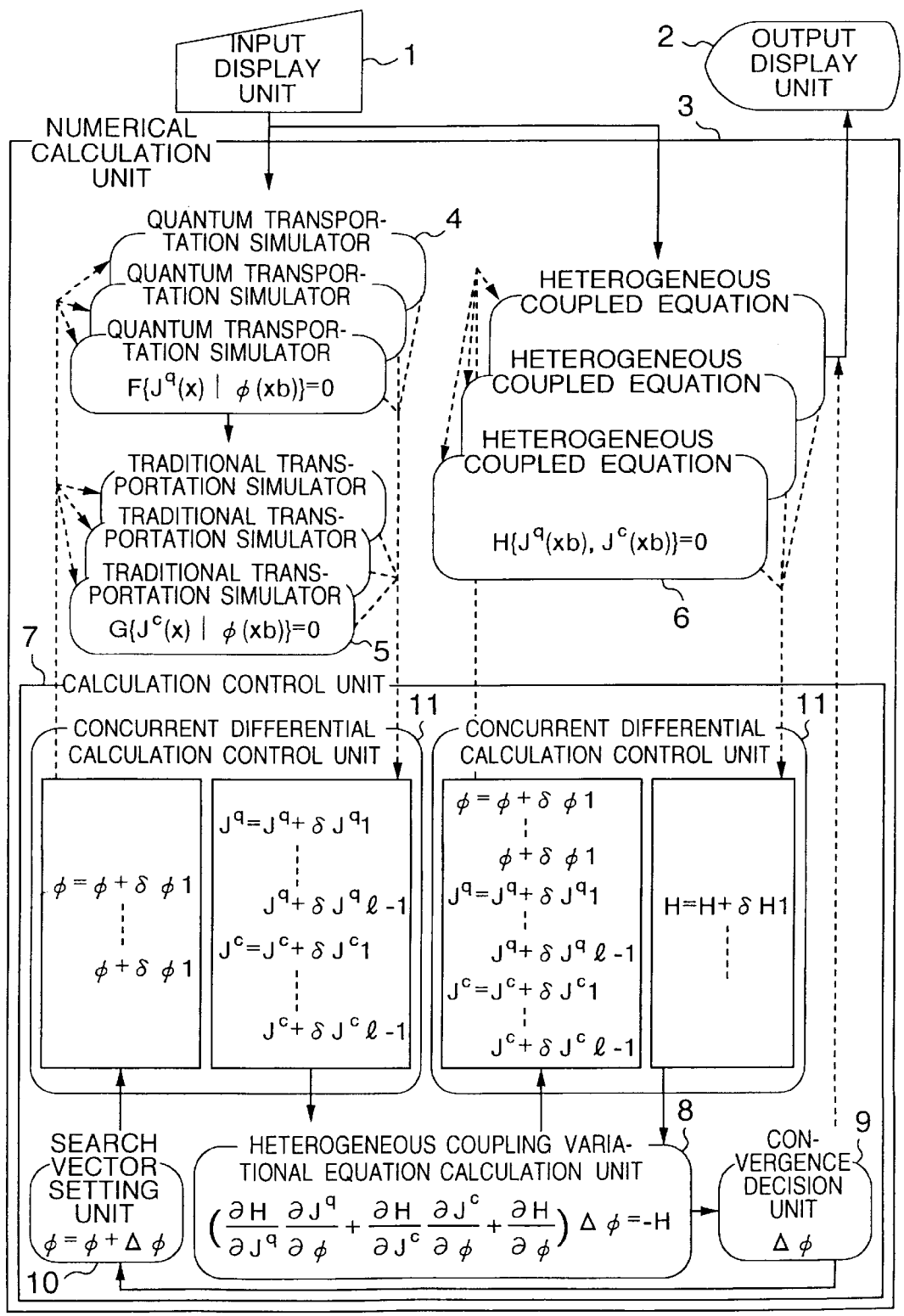
FIG. 9 is a block diagram showing a system comprising the concurrent differential calculation control unit 11 for concurrent computing between a quantum transportation simulator and a traditional transportation simulator for a nanometric device simulation according to the present invention.

FIG. 9 is a block diagram showing a nanometric device simulation in a system for concurrent computing between heterogeneous simulators according to a sixth embodiment of the invention.

This embodiment further includes the concurrent differential calculation control unit 11 in the calculation control unit in the fifth embodiment shown in FIG. 8.

The concurrent differential calculation control unit 11 sets φ(xb)+67 φ(xb1), . . . , φ(xb)+δφ(xbl) and φ(xb) obtained by modulating infinitesimal amounts δφ(xb1), . . . , δφ(xbl) for the parameters φ(xb) {φ(xb1), . . . , φ(xbl)}. Also, (l+1) quantum transportation simulators 4 and (l+1) traditional transportation simulators 5 are set in the numerical calculation unit 3. Then, the parameters φ(xb)+δφ(xb1), . . . , φ(xb)+δφ(xbl) and φ(xb) thus set are applied to the (l+1) quantum transportation simulators 4 and the (l+1) traditional transportation simulators 5. The locally consistent solutions Jq(xb)+δJq(xb1), . . . , Jq(xb)+δJq (xbl−1) and Jc(xb)+δJc (xb1), . . . , Jc(xb)+δJc(xbl−1) are retrieved thereby to form {∂Jq(xb)/∂φ(xb)}1−l×l and {∂Jc(xb)/∂φ(xb)}1−l×l, which are applied to the heterogeneous coupling variational equation calculation unit 8.

The heterogeneous coupling variational calculation unit 8 sets the parameters φ(xb)+δφ(xb1), . . . , φ(xb)+δφ(xbl) and φ(xb1) and the variables Jq(xb)+δJq(xb1), . . . , Jq(xb)+δJq (xbl−1) and Jc(xb)+δJc(xb1), . . . , Jc(xb)+δJc(xbl−1) in the concurrent differential calculation control unit 11.

The concurrent differential calculation control unit 11 combines the parameter φ(xb) and the variables Jq(xb), Jc(xb), and sets {φ(xb)+δφ(xb1), Jq(xb), Jc(xb)}, . . . , {φ(xb)+δφ(xbl), Jq(xb), Jc(xb)}, {φ(xb), Jq(xb)+δJq(xb1), Jc(xb)}, . . . , {φ(xb), Jq(xb)+δ(Jq(xbl)−1), Jc(xb)}, {φ(xb), Jq(xb), Jc(xb)+δJc(xb1)}, . . . , {φ(xb), Jq(xb), Jc(xb)+δJq (xbl−1)}, {φ(xb), Jq(xb), Jc(xb)}. Also, (3l−1) heterogeneous coupled equations 6 are set in the numerical calculation unit 3. The combinations of the parameter φ(xb) and the variables Jq(xb), Jc(xb) thus set are applied to the (3l−1) heterogeneous coupled equations 6, and the concurrenty-processed values H of H +δH1, . . . , H are retrieved thereby to form {∂H/∂φ(xb)}l×l, {∂H/∂Jq(xb)}l×l−1, {∂H/∂Jc(xb) }l×l−1, which are applied to the numerical calculation unit for the heterogeneous coupling variational equation. The heterogeneous coupling variation equation according to equation 8 formed from these values of {∂Jq(xb)/∂φ(xb)}1−l×l, {∂Jc(xb)/∂φ(xb)}1−l×l, {∂H/∂φ(xb)}l×l, {∂H/∂Jq(xb) }l×l−1, {∂H/∂Jc(xb)}l×l−1 and H are solved thereby to determine the increment Δφ(xb) of the parameter φ(xb). In the process, if the (l+1) quantum transportion simulators 4, the (l+1) traditional transportation simulators 5 and the (3l−1) heterogeneous coupled equations 6 are concurrently processed, the time required for each iterative calculation is substantially the same as in the conventional noncoupled method, in view of the fact that the linear variational equation for heterogeneous coupling according to equation 8 and the heterogeneous coupled equation 6 are in the same dimension. In adition, since the number of iterations is substantially the same as in the conventional stable coupled method, this system is considered an extremely high-speed, stable system for concurrent computing between a quantum transportation simulator for nanometric devices and a traditional transportation simulator.

Figure 10:
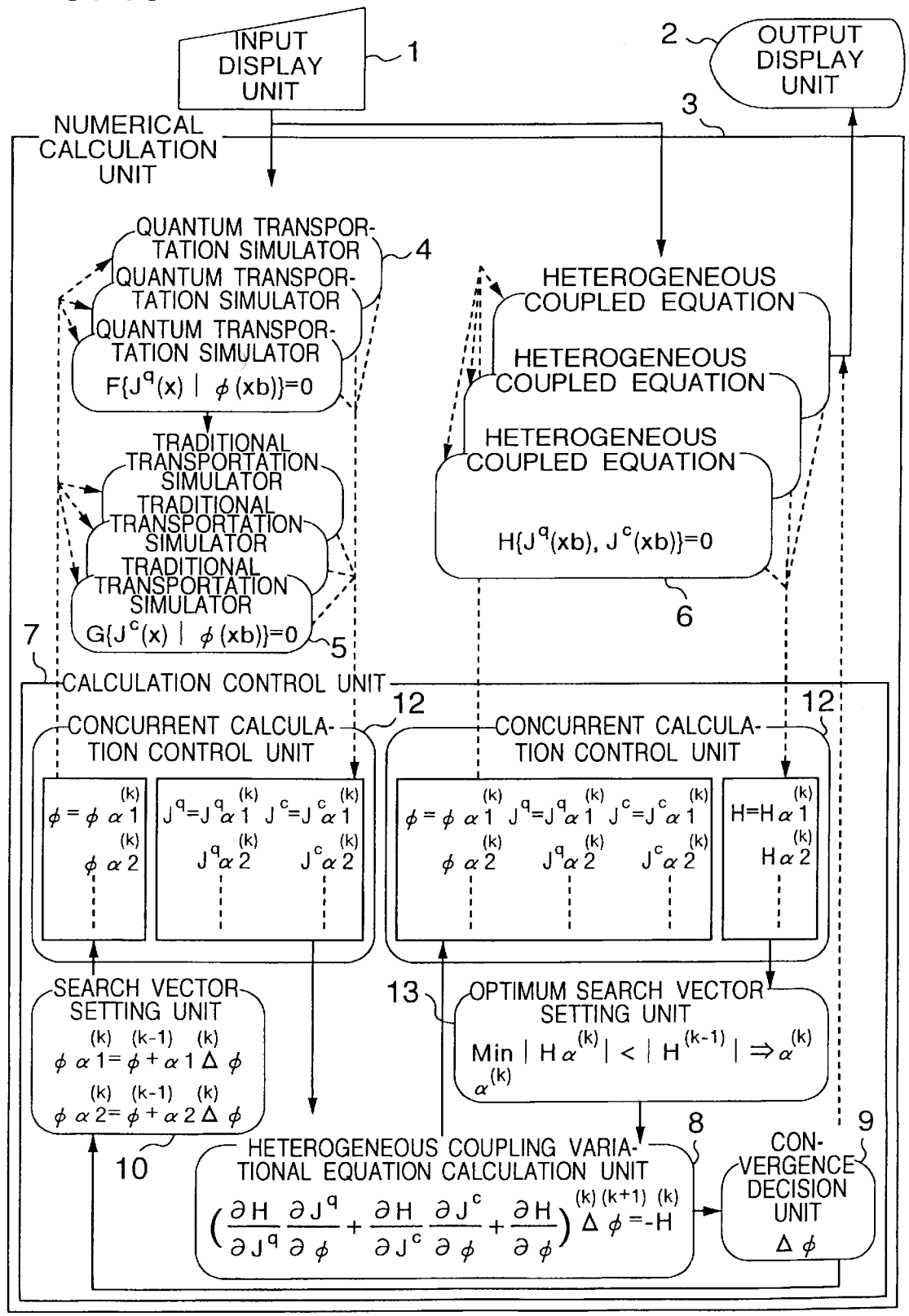
FIG. 10 is a block diagram showing a system comprising the concurrent calculation control unit 12 and the optimum search vector setting unit 13 for concurrent computing between a quantum transportation simulator and a traditional transportation simulator for a nanometric device simulation according to the present invention.

FIG. 10 is a block diagram showing a nanometric device simulation for a system for concurrent computing between heterogeneous simulators according to a seventh embodiment of the present invention.

This embodiment is equivalent to the fifth embodiment shown in FIG. 8 in which the calculation control unit further includes the concurrent calculation control unit 12 and the optimum search vector setting section 13.

Figure 11:
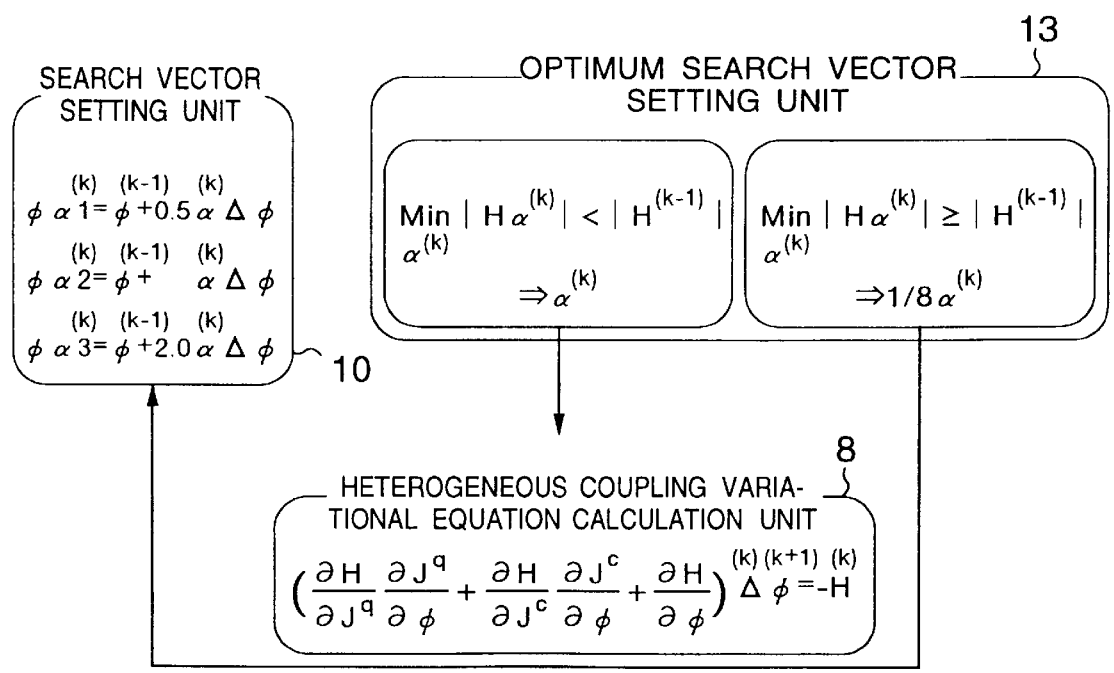
FIG. 11 is a block diagram showing a system comprising the optimum search vector setting unit 13 and the search vector setting unit 10 for concurrent computing between a quantum transportation simulator and a traditional transportation simulator for a nanometric device simulation according to the present invention.

The search vector setting unit 10 sets new parameters $\phi(xb)\alpha1$, $\phi(xb)\alpha2$, ... $\{\phi(xb)+\alpha1\Delta\phi(xb), \phi(xb)+\alpha2\Delta\phi(xb)$ and so on$\}$ including a plurality of increment coefficients $\alpha(\alpha1, \alpha2, ...)$ for the increment $\Delta\phi(xb)$ of the parameter $\phi(xb)$ in the concurrent calculation control unit 12. Also, as shown in FIG. 11, three increment coefficients $0.5\alpha, \alpha, 2.0\alpha$ are set according to the increment coefficient of $\alpha(0<\alpha<1)$.

The concurrent calculation control uni 12 sets a plurality of the quantum transportation simualtors 4 and a plurality of the traditional transportation simulators in the numerical calculation unit 3. Then, the parameters $\phi(xb)\alpha1$, $\phi(xb)\alpha2$ and so forth are applied to a plurality of the quantum transportation simulators and the traditional transportation simulators 5. The locally consistent solutions $Jq(xb)\alpha1$, $Jq(xb)\alpha2$ and so forth and $Jc(xb)\alpha1$, $Jc(xb)\alpha2$ and so forth obtained by concurrent processing are retrieved and applied to the heterogeneous coupling variational equation calculation unit 8.

The heterogeneous coupling variational equation calculation unit 8 sets the parameters $\phi(xb)\alpha1$, $\phi(xb)\alpha2$ and so forth, the variables $Jq(xb)\alpha1$, $Jq(xb)\alpha2$ and so forth, and the variables $Jc(xb)\alpha1$, $Jc(xb)\alpha2$ and so forth in the concurrent calculation control unit 12.

The concurrent calculation control unit 12 sets the combinations of the parameter $\phi(xb)$ and the variables $Jq(xb)$, $Jc(xb)$ including $\{\phi(xb)\alpha1, Jq(xb)\alpha1, Jc(xb)\alpha1\}$, $\{\phi(xb)\alpha2, Jq(xb)\alpha2, Jc(xb)\alpha2\}$, and so forth. Also, a plurality of the heterogeneous coupled equations 6 are set in the numerical calculation unit 3. The combinations of the parameter $\phi(xb)$ and the variables $Jq(xb)$, $Jc(xb)$ thus set including $\{\phi(xb)\alpha1$, $Jq(xb)\alpha1, Jc(xb)\alpha\}$, $\{\phi(xb)\alpha2, Jq(xb)\alpha2, Jc(xb)\alpha2\}$ and so forth, are applied to a plurality of the heterogeneous coupled equations 6, and the values H including $H\alpha1$, $H\alpha2$ and so forth obtained by concurrent processing are retrieved and applid to the optimum search vector setting unit 13.

The optimum search vector setting unit 13 applies the value $H\alpha$ associated with the minimum norm smaller than the minimum norm of H in the preceding iterative calculation among $H\alpha1$, $H\alpha2$ and so on to the numerical calculation unit 8 for heterogeneous couple equation.

In the heterogeneous coupled equation calculation unit 8, only the linear variational equation for heterogeneous coupling according to equation 8 formed from the parameter $\phi(xb)\alpha$, the variables $Jq(xb)\alpha$, $Jc(xb)\alpha$ and the value H of $H\alpha$ for the set value $\alpha$ is solved thereby to produce the increment $\Delta\phi(xb)$ for the optimum parameter $\phi(xb)$. Also, as shown in FIG. 11, in the case where the value $H\alpha$ associated with the minumum norm among $H\alpha1$, $H\alpha2$ and so forth is larger than the minimum norm of H for the preceding iterative calculation, the value $\alpha$ is reduced by a factor of $\frac{1}{8}$ in order to reduce the nonlinearity. This process is repeated. The superscript "k" attached in FIG. 10 denotes a value for the k-th iteration. In the process, if a plurality of the quantum transportion simulators 4, a plurality of the traditional transportation simulators 5 and a plurality of the heterogeneous coupled equations 6 are concurrently processed, then an optimum search vector is set and therefore the number of iterations is reduced to contribute to an extremely high speed and a high convergence as compared with the conventional coupled method. As a result, this system is considered an extremely high-speed and a very stable system for concurrent computing between a quantum transportation simulator for nanometric device simulation and a traditional transport simulator.

It will thus be understood from the foregoing description that according to the present invention, an increased volume of program development required for restructuring a simulator in the conventional coupled method and the unstable convergence in the conventional noncoupled method can be avoided. Further, the concurrent processing is taken advantage of to realize an extremely high speed as compared with the required iteration time for the noncoupled method and a very high stability as compared with the convergence characteristic of the coupled method. Furthermore, even with progressively complicated physical phenomena, the simulation engineer can produce a globally consistent solution automatically simply by setting a new heterogeneous coupled equation. A method and a system for concurrent computing between heterogeneous simulators thus are realized which can very effectively support the analysis and designing work of the operator.

We claim:

1. A method of concurrent computing between heterogeneous simulators using a computer comprising an input display unit, a numerical calculation unit and an output display unit, comprising the steps of:

inputting and setting the information on at least two types of simulator defined by a parameter and variables and the information on a heterogeneous coupled equation for correlating said parameter and said variables in said numerical calculation unit from said input display unit;

determining a globally consistent solution by said numerical calculation unit from said information input and set; and displaying the solution thus determined on said output display unit, wherein said numerical calculation unit includes a calculation control unit having an agent function comprising the steps of:

(1.1) retrieving a locally consistent solution obtained from each simulator for said parameter;

(1.2) substituting said parameter and said variables into at least one heterogeneous coupled equation thereby to retrieve a substitute;

(1.3) solving a heterogeneous coupling variational equation for the substitute thus retrieved and said parameter and said variables thereby to determine a variation of said parameter;

(1.4) deciding on the convergence of said variation;

(1.5) changing said parameter by a predetermined amount and repeating said steps (1.1) to (1.4) in the absence of convergence; and (1.6) outputting a globally consistent solution to said output display unit in the presence of convergence.

2. A method of concurrent computing between heterogeneous simulators using a computer comprising an input display unit, a numerical calculation unit and an output display unit, comprising the steps of:

inputting and setting the information on a first simulator defined by a parameter p and a variable x, a second simulator defined by the parameter p and a second variable y and a heterogeneous coupled equation for correlating the parameter p and the variables x, y in said numerical calculation unit from said input display unit;

determining globally consistent solutions p, x, y from the information input and set; and displaying the solutions thus determined on said output display unit, wherein said numerical calculation unit includes a calculation control unit having a function comprising the steps of:

(1.1) retrieving a locally consistent solution x obtained from said first simulator and a locally consistent solution obtained from said second simulator for said parameter p;

(1.2) substituting said parameter p and said variables into x, y into said heterogeneous coupled equation thereby to retrieve a substitute H;

(1.3) solving a heterogeneous coupling variational equation for the substitute H thus retrieved and said parameter p and said variables x, y thereby to determine a variation $\Delta p$ of said parameter p;

(1.4) deciding on the convergence of said variation $\Delta p$;

(1.5) changing said parameter p by a predetermined amount and repeating said steps (1.1) to (1.4) in the absence of convergence; and (1.6) outputting globally consistent solutions p, x, y to said output display unit in the presence of convergence.

3. A system for concurrent computing between heterogeneous simulators, comprising:

an input display unit for inputting and displaying information on a first simulator defined a parameter p and a variable x, a second simulator defined by the parameter p and a variable y, and a heterogeneous coupled equation for correlating the parameter p and the variables x, y;

a numerical calculation unit for determining globally consistent solutions p, x, y from the input information; and an output display unit for displaying the values of the solutions p, x, y thus determined;

wherein said numerical calculation unit includes a calculation control unit including;

(2.1) means for retrieving a locally consistent solution x obtained from the first simulator and a locally consistent solution y obtained from the second simulator for said parameter p, (2.2) means for substituting said parameter p and said variables x, y into a heterogeneous coupled equation and retrieving a substitute H, (2.3) means for solving a heterogeneous coupling variational equation for the retrieved substitute H, said parameter p and said variables x, y and determining a variation $\Delta p$ of said parameter p, (2.4) means for deciding on the convergence of said variation $\Delta p$, (2.5) means for setting a search vector by changing said parameter $\Delta p$ by a predetermined amount and repeating said steps defined in said means (2.1) to (2.4) in the absence of convergence, and (2.6) means for outputting and displaying the values of globally consistent solutions p, x, y on said display unit in the presence of convergence.

4. A method of concurrent computing between heterogeneous simulators according to claim 2, wherein:

said step (1.1) includes (3.1) step of inputting and setting a plurality of said first simulators and a plurality of said second simulators in said numerical calculation unit and supplying a plurality of said first simulators and a plurality of said second simulators with $p+\delta p1, \ldots, p+\delta pl$, p obtained by modulating said parameter p (p1, \ldots, pl) by infinitesimal amounts $\delta p1, \ldots, pl$, respectively, and (3.2) step of retrieving the locally consistent solutions $x+\delta x1, \ldots, x+\delta xm$, x obtained by concurrent processing with a plurality of said first simulators and the locally consistent solutions $y+\delta y1, \ldots, y+\delta yn$, y obtained by concurrent processing with a plurality of said second simulators; and said step (1.2) includes (3.3) step of inputting and setting a plurality of heterogeneous coupled equations in said numerical calculation unit and applying the parameters $p+\delta p1, \ldots, p+\delta pl$, p and the variables $x+\delta x1, \ldots, x+\delta xm$, x and $y+\delta y1, \ldots, y+\delta yn$, y to a plurality of the heterogeneous coupled equations, and (3.4) step of retrieving the substitutes $H+\delta H1, \ldots, H$ obtained by concurrent processing with a plurality of said heterogeneous coupled equations.

5. A system for concurrent computing between heterogeneous simulators according to claim 3, wherein:

said means (2.1) includes (4.1) means of inputting and setting a plurality of said first simulators and a plurality of said second simulators in said numerical calculation unit and supplying a plurality of said first simulators and a plurality of said second simulators with $p+\delta p1, \ldots, p+\delta pl$, p obtained by modulating said parameter p (p1, \ldots, pl) by infinitesimal amounts $\delta p1, \ldots, \delta pl$, respectively, and (4.2) means of retrieving the locally consistent solutions $x+\delta x1, \ldots, x+\delta xm$, x obtained by concurrent processing with a plurality of said first simulators and the locally consistent solutions $y+\delta y1, \ldots, y+\delta yn$, y obtained by concurrent processing with a plurality of said second simulators; and said means (2.2) includes (4.3) means of inputting and setting a plurality of heterogeneous coupled equations in said numerical calculation unit (3) and applying the parameters $p+\delta p1, \ldots, p+\delta pl$, p and the variables $x+\delta x1, \ldots, x+\delta xm$, x and $y+\delta y1, \ldots, y+\delta yn$, y to a plurality of the heterogeneous coupled equations, and (4.4) means of retrieving the substitutes $H+\delta H1, \ldots, H$ obtained by concurrent processing with a plurality of said heterogeneous coupled equations.

6. A method of concurrent computing between heterogeneous simulators according to claim 2, wherein:

said step (1.1) includes (5.1) step of inputting and setting a plurality of first simulators and a plurality of second simulators in said numerical calculation unit and inputting and setting a plurality of parameters $p\alpha 1, p\alpha 2$ and so on including a plurality of variation coefficients $\alpha$ ($\alpha 1$, $\alpha 2$ and so on) for a variation $\Delta p$ of the parameter p in a plurality of said first simulators and a plurality of said second simulators, and (5.2) step of retrieving a plurality of locally consistent solutions $x\alpha 1, x\alpha 2$ and so on obtained by concurrent processing in a plurality of said first simulators and a plurality of locally consistent solutions $y\alpha 1, y\alpha 2$ and so on obtained by concurrent processing in a plurality of said second simulators;

said step (1.2) includes (5.3) step of setting a plurality of heterogeneous coupled equations in said numerical calculation unit and substituting the parameters $p\alpha 1, p\alpha 2$ and so on and the variables $x\alpha 1, x\alpha 2$ and so on, and $y\alpha 1, y\alpha 2$ and so on, into a plurality of heterogeneous coupled equations, and (5.4) step of retrieving the substitutes H1, H2 and so on obtained by concurrent processing with a plurality of said heterogeneous coupled equations;

said step (1.3) includes (5.5) step of setting a value $H\alpha$ associated with a minimum norm among $H\alpha 1, H\alpha 2$ and so on, which minimum norm is smaller than the minimum norm of H in the preceding iterative calculation, and (5.6) step of solving a heterogeneous coupling variational equation for the value $H\alpha$ thus set thereby to determine an increment $\Delta p$ of the parameter p, and said step (1.5) includes (5.7) step of setting new parameters $P\alpha 1 = P + \alpha 1 \Delta P$, $P\alpha 2 = P + \alpha 2 \Delta P$ and so on including a plurality of said increment coefficients $\alpha$ ($\alpha 1$, $\alpha 2$ and so on) for the increment $\Delta P$ thus determined, and (5.8) step of repeating said steps (1.1) to (1.4) on the basis of the new parameters thus set.

7. A system for concurrent computing between heterogeneous simulators according to claim 3, wherein:

said means (2.1) includes (6.1) means of inputting and setting a plurality of first simulators and a plurality of second simulators in said numerical calculation unit and inputting and setting a plurality of parameters $p\alpha 1$, $p\alpha 2$ and so on including a plurality of variation coefficients $\alpha$ ($\alpha 1$, $\alpha 2$ and so on) for a variation $\Delta p$ of the parameter p in a plurality of said first simulators and a plurality of said second simulators, and (6.2) means of retrieving a plurality of locally consistent solutions $x\alpha 1$, $x\alpha 2$ and so on obtained by concurrent processing in a plurality of said first simulators and a plurality of locally consistent solutions $y\alpha 1$, $y\alpha 2$ and so on obtained by concurrent processing in a plurality of said second simulators;

said means (2.2) includes (6.3) means of setting a plurality of heterogeneous coupled equations in said numerical calculation unit and substituting the parameters $p\alpha 1$, $p\alpha 2$ and so on and the variables $x\alpha 1$, $x\alpha 2$ and so on, and $y\alpha 1$, $y\alpha 2$ and so on, into a plurality of heterogeneous coupled equations, and (6.4) means of retrieving the substitutes H1, H2 and so on obtained by concurrent processing with a plurality of said heterogeneous coupled equations;

said means (2.3) includes (6.5) means of setting a value $H\alpha$ associated with a minimum norm among $H\alpha 1$, $H\alpha 2$ and so on, which minimum norm is smaller than the minimum norm of H in the preceding iterative calculation, and (6.6) means of solving a heterogeneous coupling variational equation for the value $H\alpha$ thus set thereby to determine an increment $\Delta p$ of the parameter p, and said means (2.5) includes (6.7) means of setting new parameters $P\alpha 1 = P + \alpha 1 \Delta P$, $P\alpha 2 = P + \alpha 2 \Delta P$ and so on including a plurality of said increment coefficients $\alpha$ ($\alpha 1$, $\alpha 2$ and so on) for the increment $\Delta P$ thus determined, and (6.8) means of repeating the steps of processing by said means (2.1) to (2.4) on the basis of the new parameters thus set.

8. A system for concurrent computing between heterogeneous simulators according to claim 6, wherein:

said step (5.5) includes (7.1) step of multiplying $\alpha$ by $\frac{1}{8}$ in the case where the value $H\alpha$ associated with a minimum norm among $H\alpha 1$, $H\alpha 2$ and so on is larger than the minimum norm of H in the preceding iterative calculation; and said step (5.7) includes (7.2) step of setting three increment coefficients including $0.5\alpha$, $\alpha$ and $2.0\alpha$ ($0<\alpha<1$) for the increment $\Delta p$ of the parameter p.

9. A system for concurrent computing between heterogeneous simulators according to claim 7, wherein:

said means (6.5) includes (8.1) means of multiplying $\alpha$ by $\frac{1}{8}$ in the case where the value $H\alpha$ associated with a minimum norm among $H\alpha 1$, $H\alpha 2$ and so on is larger than the minimum norm of H in the preceding iterative calculation; and said means (6.7) includes (8.2) means of setting three increment coefficients including $0.5\alpha$, $\alpha$ and $2.0\alpha$ ($0<\alpha<1$) for the increment $\Delta p$ of the parameter p.

10. A method of concurrent computing between heterogeneous simulators according to claim 2, wherein the heterogeneous coupling variational equation in said step (1.3) is the linear variational equation for the heterogeneous coupled equation.

11. A computer storage device readable by a machine, tangibly embodying a program of instructions executable by the machine to perform the method steps of claim 1.

12. A computer storage device readable by a machine, tangibly embodying a program of instructions executable by the machine to perform the method steps of claim 2.

* * * * *